(12) United States Patent
Fuller

(10) Patent No.: US 9,122,891 B2
(45) Date of Patent: Sep. 1, 2015

(54) FUNCTIONAL TIMING SENSORS

(71) Applicant: Microsoft Corporation, Remond, WA (US)

(72) Inventor: J. Scott Fuller, Scotts Valley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/964,911

(22) Filed: Aug. 12, 2013

(65) Prior Publication Data

US 2015/0042375 A1    Feb. 12, 2015

(51) Int. Cl.
*G06F 17/50* (2006.01)
*G06F 21/64* (2013.01)
*H03K 3/037* (2006.01)

(52) U.S. Cl.
CPC ............. *G06F 21/64* (2013.01); *G06F 17/505* (2013.01); *G06F 17/5031* (2013.01); *H03K 3/0375* (2013.01)

(58) Field of Classification Search
CPC ... G06F 11/28; G06F 17/5031; G06F 21/554; H03K 3/0375; H03K 19/007; H03H 11/26; G11C 29/023
USPC .................. 326/8–16; 713/187–194
See application file for complete search history.

(56) References Cited

U.S. PATENT DOCUMENTS

| | | | |
|---|---|---|---|
| 5,471,159 A | 11/1995 | Stuebing et al. | |
| 6,321,366 B1 | 11/2001 | Tseng et al. | |
| 6,356,610 B1 | 3/2002 | Ott | |
| 6,810,515 B2 * | 10/2004 | Lu et al. ................ | 716/104 |
| 7,392,413 B2 * | 6/2008 | Shikata .................. | 713/321 |
| 7,590,880 B1 | 9/2009 | Hershman | |
| 7,733,139 B2 * | 6/2010 | Huang .................... | 327/158 |
| 8,159,888 B2 * | 4/2012 | Raghunathan et al. ........ | 365/193 |
| 8,222,943 B2 | 7/2012 | Sood et al. | |
| 8,255,748 B2 * | 8/2012 | Moyer et al. ............. | 714/724 |
| 8,378,710 B1 | 2/2013 | Al-Kadi et al. | |
| 8,455,727 B2 * | 6/2013 | Goblirsch et al. .......... | 800/312 |
| 8,627,145 B2 * | 1/2014 | Swoboda ................. | 714/30 |
| 2006/0026543 A1 | 2/2006 | Jayaraman et al. | |
| 2007/0080701 A1 | 4/2007 | Kim et al. | |
| 2008/0024173 A1 * | 1/2008 | Nagai et al. ............. | 327/20 |

FOREIGN PATENT DOCUMENTS

WO    2011109713 A2    9/2011

OTHER PUBLICATIONS

Knight, et al., "An IDDQ Sensor for Concurrent Timing Error Detection", Retrieved at <<http://ieeexplore.ieee.org/xpl/articleDetails.jsp?reload=true&arnumber=628335>> In IEEE International Symposium on Defect and Fault Tolerance in VLSI Systems, Oct. 20, 1997, pp. 9.

(Continued)

*Primary Examiner* — Vibol Tan
(74) *Attorney, Agent, or Firm* — Gregg Wisdom; Judy Yee; Micky Minhas

(57) ABSTRACT

A functional timing sensor includes a setup time violation detecting circuit, a hold time violation detecting circuit, and an interface from the setup time violation detecting circuit and the hold time violation detecting circuit. The interface provides a notification upon detection of a violation by either the setup time violation detecting circuit or the hold time violation detecting circuit.

20 Claims, 11 Drawing Sheets

(56) References Cited

OTHER PUBLICATIONS

Tsiatouhas, et al., "A Sense Amplifier Based Circuit for Concurrent Detection of Soft and Timing Errors in CMOS ICs", Retrieved at <<http://ieeexploreieee.org/xpl/articleDetails.jsp?reload=true&arnumber=1214360&contentType=Conference+Publications>>, in 9th IEEE On-Line Testing Symposium, Jul. 7, 2003, pp. 5.

Gherman, et al., "Error Prediction based on Concurrent Self-test and Reduced Slack Time", Retrieved at <<http://ieeexplore.ieee.org/xpl/articleDetails.jsp?reload=true&arnumber=5763258&contentType=Conference+Publications>>, In Design, Automation & Test in Europe Conference & Exhibition, Mar. 14, 2011, pp. 6.

Anderson, et al., "Tamper Resistance—a Cautionary Note", Retrieved at <<http://www.cl.cam.ac.uk/~mgk25/tamper.pdf>>, In Proceedings of the 2nd Conference on Proceedings of the Second USENIX Workshop on Electronic Commerce—vol. 2, Nov. 18, 1996, pp. 11.

ISA European Patent Office, International Search Report and Written Opinion PCT/US2014/050250, Nov. 17, 2014, Netherlands, 11 Pages.

* cited by examiner

FUNCTIONAL TIMING SENSORS

BACKGROUND

Secure semiconductor devices may include security related content and functions, such as cryptographic keys or digital identities. The semiconductor device must operate correctly in order for the secure content and functions to be protected. However, the secure devices are often physically possessed by an end user wishing to exploit the secure content and functions. Vulnerabilities in the secure devices may be produced by altering the environment of the secure device. For example, raising or lowering the environmental temperature or altering the voltage supply to the secure device may cause data to take a different path than the intended path, causing a vulnerability. Environmental sensors may be coupled to the secure device to detect potentially hostile conditions. However, an attacker may alter conditions that do not have a corresponding sensor, or may utilize multiple altered conditions that may not individually trigger an environmental sensor, but when combined may cause a vulnerability in the secure device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A functional timing sensor may be employed to detect timing violations in a digital logic circuit. The timing violations may include setup time violations and hold time violations.

DETAILED DESCRIPTION

Secure semiconductor devices may be vulnerable to attacks by end users who control the environment surrounding the secure device. Environmental sensors may be used to detect gross changes in environmental conditions, but may not detect all potential environmental condition changes or may not detect combinations of environmental condition changes, which nonetheless leave the secure device susceptible to vulnerabilities.

As discussed herein, a functional timing sensor may be employed that detects the result of environmental condition changes, rather than the environmental condition change itself. Rather, the functional timing sensor may be designed to barely satisfy timing conditions, such that changes in the timing of digital logic circuitry result in timing violations, which may be used to shut down or otherwise heighten protection of the secure device.

Functional timing sensors may include setup time violation sensors and hold time violation sensors which may be built from digital logic components. The functional timing sensors may be designed such that for example, any increase or decrease in input clock speed above a threshold amount will cause a setup time or hold time violation. The functional timing sensors may have the most critical timing margins of any digital logic circuits within a secure device, such that a timing violation is detected before any vulnerabilities occur within secure portions of the device.

Figure 1:
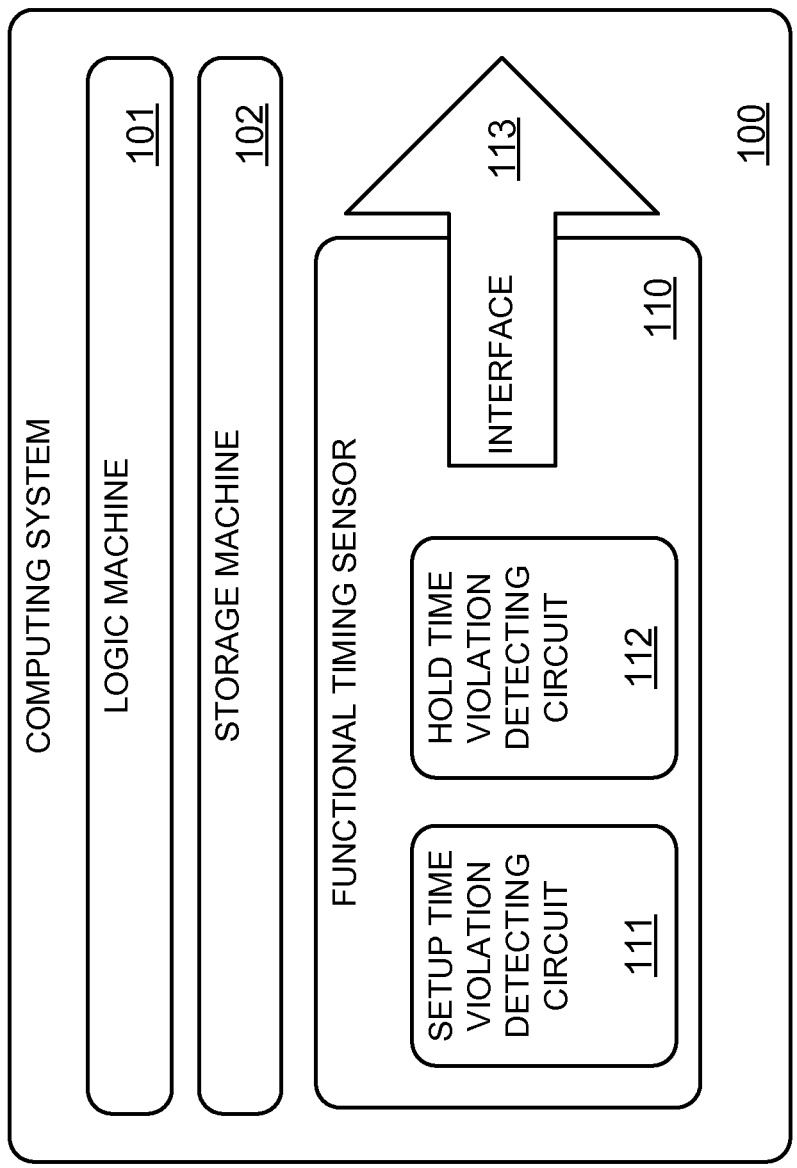
FIG. 1 schematically shows an example system on chip including a functional timing sensor in accordance with the present disclosure.

FIG. 1 schematically shows a non-limiting embodiment of a computing system 100 that can enact one or more of the methods and processes described herein. Computing system 100 is shown in simplified form. Computing system 100 may take the form of one or more personal computers, server computers, tablet computers, home-entertainment computers, network computing devices, gaming devices, mobile computing devices, mobile communication devices (e.g., smart phone), and/or other computing devices.

Computing system 100 includes logic machine 101 and storage machine 102. Computing system 100 may optionally include a display subsystem, input subsystem, communication subsystem, and/or other components not shown in FIG. 1.

Logic machine 101 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 102 includes one or more physical devices configured to hold instructions executable by the logic machine to implement the methods and processes described herein. When such methods and processes are implemented, the state of storage machine 102 may be transformed—e.g., to hold different data.

Storage machine 102 may include removable and/or built-in devices. Storage machine 102 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 102 may include volatile, nonvolatile, dynamic, static, read/write, read-only, random-access, sequential-access, location-addressable, file-addressable, and/or content-addressable devices.

It will be appreciated that storage machine 102 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 101 and storage machine 102 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Logic machine 101 and storage machine 102 may be implemented as part of a computing system that is physically possessed by an end user. As such, the computing system may be in the control of an end user who is motivated to compromise the designed security of those systems. For example the owner of a game console might be motivated to pirate a game title, or to cheat at an on-line game. Similarly the owner of a smart card might be motivated to commit financial fraud.

If logic machine 101 malfunctions, the mechanisms designed into the logic machine to protect digital assets stored in storage machine 102 cannot be relied on. Often, hackers and adversaries attempt to induce malfunctions in order to create vulnerabilities to exploit. For example an attacker might reduce the voltage supplying the logic machine, which could cause a program running in the logic machine to take a branch different than the intended designed program flow. The altered program flow could induce a vulnerability that could be taken advantage of by the adversary.

An adversary often has control over the logic machine environment, making the logic machine environment a likely attack vector. For example, a hacker can control the temperature of the logic machine. The logic machine may be designed to operate correctly over a limited temperature range, so a hacker might raise or lower the temperature in order to induce a malfunction that would result in an exploitable vulnerability. In addition to voltage and temperature, there are other environmental factors that can affect proper operation. If the input clock frequency is too high or too low, the logic machine may not operate correctly. For example, directed light may be used to induce faults in a logic machine. Other forms of radiation have also been used to create an exploitable vulnerability.

Logic machines designed for high security in potentially hostile environments often use environmental sensors designed into the logic machine. Examples of such sensors include a power supply voltage sensor that detects if the power supply voltage is too high or too low, a temperature sensor that detects out of range chip temperatures, and a clock sensor that detects if the chip input reference clock is too fast or slow. Some high security smart cards also include light sensors to detect if any light is being applied. A logic machine package may shield the chip from light, so if light is detected an attack can be assumed and a response such as erasing secrets might be performed. Other sensors such as alpha-particle sensors and focused ion beam sensors may also be used.

However, sensors of this type may have a lower limit of detection that can be exploited by an attacker. For example an attacker might reduce the voltage, increase the temperature, and increase the reference clock frequency all at the same time to the point just below where the individual environmental sensors would trip. Under this condition there would be a risk that a transition on the chip would not satisfy a timing constraint, thus causing a vulnerability.

Instead of (or in addition to) using sensors that specifically detect out of range environmental factors such as temperature, voltage, or clock period, a functional sensor can be used that detects the malfunction that the environmental attacks induce. As shown in FIG. 1, computing system 100 includes a functional timing sensor 110. Functional timing sensor 110 may include one or more setup time violation detecting circuits 111 and/or one or more hold time violation detecting circuits 112. Functional timing sensor 110 may include aspects of logic machine 101 and/or storage machine 102.

A setup time or hold time violation detecting circuit may include one or more delay devices. The delay devices may include a series of inverters, buffers, logic gates, or other cells. The path delays within the setup time and hold time violation detecting circuits may be adjusted to maximize the effectiveness of the violation detecting circuits, for example by adjusting the delay device path delays as determined by a static timing analyzer tool. NAND gates and NOR gates have different rise versus fall delays, so some embodiments may use a mixture of gates to equalize the rise time delay and the fall time delay.

Functional timing sensor 110 may be coupled to other components of computing system 100 via interface 113. For example, interface 113 may allow functional timing sensor 110 to communicate with aspects of logic machine 101 and/or aspects of storage machine 102. Upon detection of a setup time or hold time violation, functional timing sensor 110 may provide a notification or signal to interface 113, indicating a violation has occurred. Interface 113 may then output a notification or signal to secure the contents of logic machine 101 and/or storage machine 102. For example, interface 113 may notify computing system 100 of a timing violation, which may then prompt computing system 100 to shut down logic machine 101, or otherwise disable access to content stored within storage machine 102.

The system depicted in FIG. 1 may thus enable one or more systems for a functional timing sensor, comprising: a setup time violation detecting circuit; a hold time violation detecting circuit; and an interface from the setup time violation detecting circuit and the hold time violation detecting circuit, the interface providing a notification upon detection of a violation by either the setup time violation detecting circuit or the hold time detecting circuit.

Figure 2:
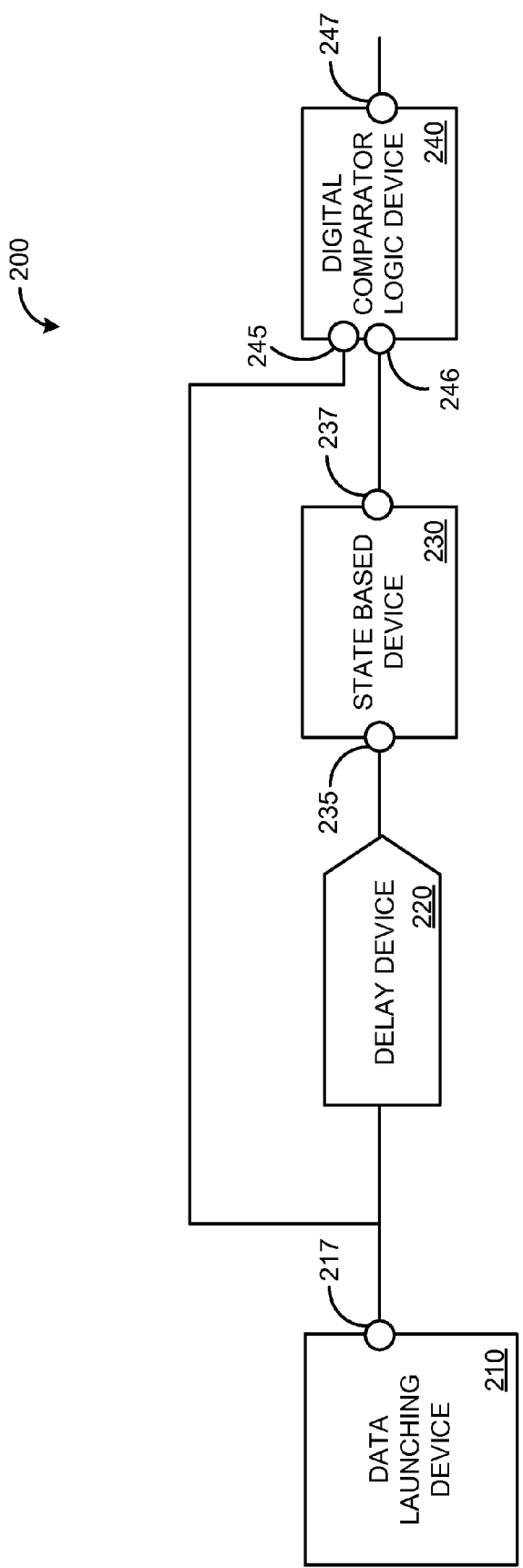
FIG. 2 schematically shows an example system for detecting setup time violations in accordance with the present disclosure.

FIG. 2 schematically shows an example digital logic circuit 200 for detecting setup time violations. Digital logic circuit 200 may comprise data launching device 210, delay device 220, state based device 230, and digital comparator logic device 240. Digital logic circuit 200 may be implemented as a subsystem of another system, such as functional timing sensor 110, or may be implemented as a stand-alone system.

As depicted in FIG. 2, data launching device 210 includes first data output 217. State based device 230 includes first data input 235 operatively coupled to first data output 217 via delay device 220, and second data output 237. Digital comparator logic device 240 includes second data input 245, which is operatively coupled to first data output 217, third data input 246 which is operatively coupled to second data output 237, and second data output 247.

Data launching device 210 may be configured to output a data signal via first data output 217. Data output from data launching device 210 may be considered to be an undelayed data signal, as data launching device 210 is upstream of delay device 220. First data output 217 may be operatively coupled to delay device 220, to state based device 230 via delay device 220, and to digital comparator logic device 240. Other devices may be coupled to first data output 217, such as a signal inverter or another state based device. Some example configurations showing other devices coupled to first data output 217 are described below and with reference to FIGS. 3 and 6. Data launching device 210 may output a continuous signal or multiple individual signals. The data may be output in response to an internal timing mechanism or an external timing mechanism, as described below and with reference to FIG. 3. Data launching device 210 may include feed-back or feed-forward circuitry in order to modulate the data which is output at first data output 217. Data launching device 210 may generate the data which is output at first data output 217, or may receive the data from an external data generating source. Data launching device 210 may include a data storage sub-device.

Delay device 220 is depicted as being operatively intermediate the data launching device and the state based device. Delay device 220 may be configured to cause the state based device to output a delayed data signal relative to the undelayed data signal output by the data launching device. Delay device 220 may be configured to delay incoming data by a fixed time period or a time period that is dependent on other factors or conditions within the digital logic circuit. Delay device 220 may store undelayed data output by data launching device 210 and output the data after a period of time, or delay device 220 may provide one or more digital delay devices the undelayed data must traverse before reaching first data input 235, for example, one or more logic gates or one or more inverters.

Delay device 220 may be employed such that the path delay between data launching device 210 and state based device 230 is at or just under the minimum cycle period for the state based device's setup time requirement. In some embodiments, the path delay will result in a setup time violation detecting circuit detecting a problematic environmental condition prior to other parts of the digital logic circuit exhibiting setup time faults. In some embodiments, the path delay may be set so that a setup time violation always occurs unless an environmental condition is altered. In these examples, the detection of a setup time violation would signify a normal condition, and non-detection of a setup time violation would signify a problematic environmental condition. A setup time violation detecting circuit, such as the circuit depicted in FIG. 1, may include a combination of multiple such types of devices and circuits.

State based device 230 may be configured to store a data signal at first data input 235, sample the data stored at first data input 235, and output the sampled data via second data output 237. In some embodiments of digital logic circuit 200, state based device 230 may sample the data stored at first data input 235 in a manner that is dependent on a setup time. For example, state based device 230 may include a digital state based storage device, such as a flip-flop or a latch that requires data held at first data input 235 to be held for a threshold time period prior to the beginning of data sampling. Such a time period may be referred to as a setup time. In this way, setup time violations may alter the data output by the state based device 230 at second data output 237. For example, the delayed data output at second data output 237 may be out-of-phase or otherwise have a value different from the expected value if a setup time violation did not occur. The delayed data may be output in response to an internal timing mechanism or an external timing mechanism, as described below and with reference to FIG. 3. The timing mechanism may be synchronized with a timing mechanism coupled to data launching device 210. In this way, digital logic circuit 200 may maintain precise timing throughout operation, and allow for alterations to that timing to manifest as setup timing violations.

Digital comparator logic device 240 may be configured to indicate a setup time violation if the delayed data signal output by state based device 230 violates a condition of comparison to the undelayed data signal output by data launching device 210. For example, digital logic circuit 200 may be configured such that the delayed data signal and undelayed data signal should have the same value at digital comparator logic device 240 if no violation has occurred. If the values are tested to be the same by digital comparator logic device 240, the condition of comparison is met. If the values are tested to be different, the condition of comparison is violated. In some examples, digital logic circuit 200 may be configured such that the delayed data signal and undelayed data signal should have different values at digital comparator logic device 240 if no violation has occurred. If the values are tested to be different by digital comparator logic device 240, the condition of comparison is met. If the values are tested to be different, the condition of comparison is violated.

Digital comparator logic device 240 may include one or more digital logic gates, such as XNOR, XOR, NAND, and/or NOR gates. Digital comparator logic device 240 may be configured to output a first value if a setup time violation is not detected and a second value if a setup time violation is detected. For example, digital comparator logic device 240 may be configured to output a value of 1 to indicate a setup time violation and to output a value of 0 to indicate no setup time violation. Alternatively, digital comparator logic device 240 may be configured to output a value of 0 to indicate a setup time violation and to output a value of 1 to indicate no setup time violation. Digital comparator logic device 240 may output a continuous signal based on the data received at data inputs 245 and 246, or may sample the data received at data inputs 245 and 246 for a period of time. In this way, occasional fluctuations in data may not be classified as setup time violations.

Third data output 247 may be further coupled to additional digital logic components, such as a data storage device or digital logic gate. Data output from digital comparator logic device 240 may be used, alone or in conjunction with other data, to impact the operation of the digital logic circuitry comprising digital logic circuit 200. For example, data indicative of a setup time violation may trigger the shut-down of secure portions of the digital logic circuitry and/or used to adjust logic parameters of the digital logic circuitry.

Figure 3:
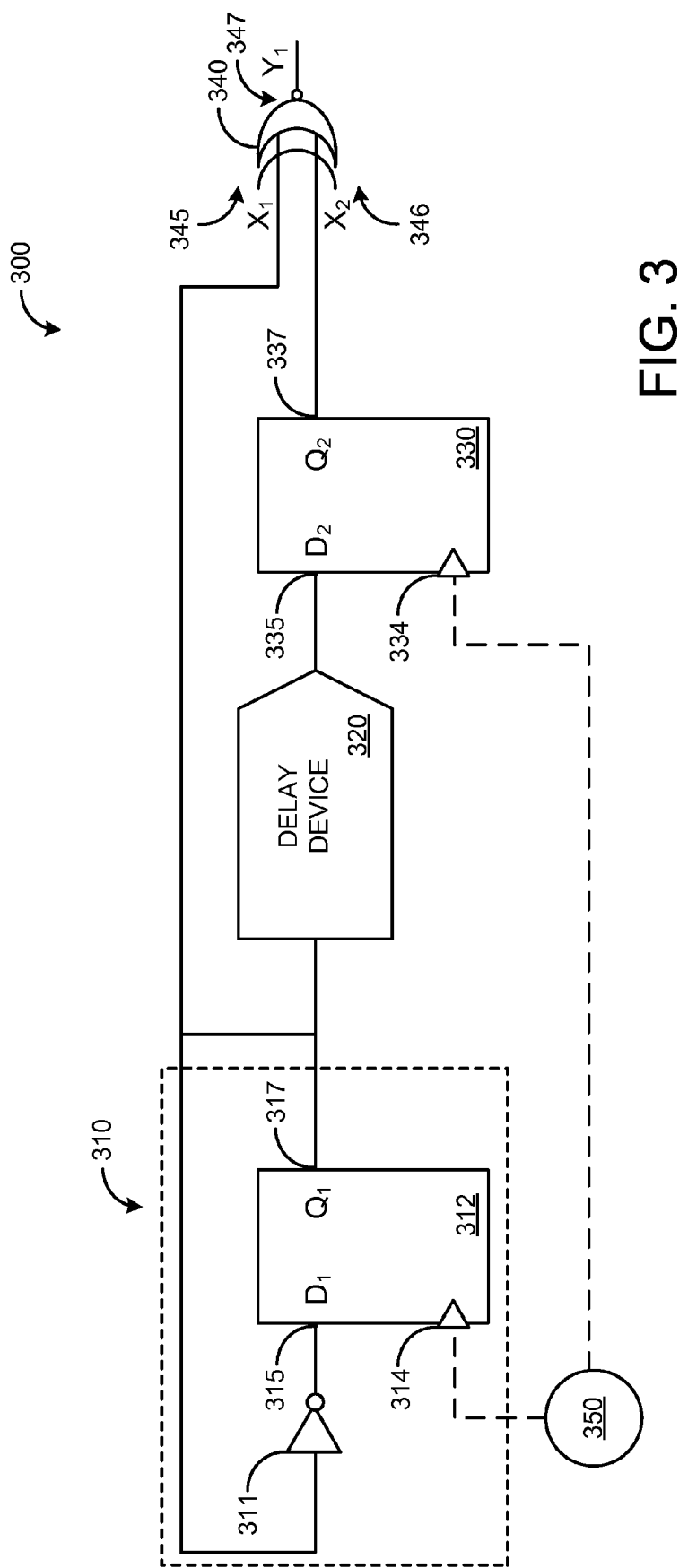
FIG. 3 schematically shows an example system for detecting setup time violations in accordance with the present disclosure.

FIG. 3 schematically shows an example digital logic circuit 300 for detecting setup time violations. Digital logic circuit 300 may include data launching device 310, delay device 320, state based device 330, digital comparator logic device 340, and clocking device 350. Digital logic circuit 300 may be implemented as a subsystem of another system, such as functional timing sensor 110, or may be implemented as a stand-alone circuit. Digital logic circuit 300 is an example embodiment of digital logic circuit 200.

As depicted in FIG. 3, data launching device 310 includes state based device 312 and inverter 311. State based device 312 is depicted as a flip-flop, but in some embodiments may be a latch or other digital logic device. State based device 312 includes first clock input 314, data input 315, and first data output 317. Inverter 311 is coupled between first data output 317 and data input 315. First clock input 314 is operatively coupled to clocking device 350.

Delay device 320 is operatively coupled between first data output 317 and data input 335. In some embodiments, delay device 320 may include a plurality of NAND and NOR gates. Delay device 320 may include NAND gates with two or more inputs, NOR gates with two or more inputs, inverters, XOR gates, buffers, OR gates, AND gates, multiplexors, adders, and/or other digital logic gates used for delaying signals. In some embodiments, data exiting delay device 320 holds the same value as data entering delay device 320. However, delay device 320 may be configured to output data with a different value than the data entering the delay device.

State based device 330 is depicted as a flip-flop, but in some embodiments may be a latch or other digital logic device. State based device 330 includes second clock input 334, data input 335, and second data output 337. Data input 335 is operatively coupled to first data output 317 via delay device 320. Second clock input 334 is operatively coupled to clocking device 350.

As depicted in FIG. 3, digital comparator logic device 340 is an XNOR gate. Digital comparator logic device 340 includes data inputs 345 and 346, and third data output 347. When configured as an XNOR gate, digital comparator logic device 340 will output a signal indicative of a setup time violation when value $X_1$ at data input 345 is equal to value $X_2$ at data input 346. In other configurations, digital comparator logic device 340 may be configured to output a signal indicative of a setup time violation when value $X_1$ at data input 345 is different from value $X_2$ at data input 346.

Clocking device 350 may be configured to output a periodic clock signal having a period equal to a first time interval, and including a trigger element during each period. State based devices 312 and 330 will be described herein as positive edge triggered flip-flops. As such, the trigger element included in each period will be described as the edge of a transition from a lower value to a higher value within the periodic clock signal. In some example systems, state based devices 312 and 330 may be negative edge triggered flip-flops, level triggered flip-flops (also referred to as latches), or a combination thereof.

In this example, state based device 330 is configured to sample the data stored at first data input 335 for a second time interval prior to a trigger element reaching second clock input 334, the second time interval being shorter than the first time interval, and to output the sampled data via second data output 337 in the form of a delayed data signal in response to the trigger element reaching the second clock input. In other words, data held at data input 335 is sampled by the flip-flop in response to a leading clock edge reaching clock input 334. The value at second data output 337 is then updated to reflect the value of the sampled data. The second time interval beginning prior to a trigger element is referred to herein as the setup time for the flip-flop. Data must be stably held at data input 335 to be reliably sampled and transferred to second data output 337. Data arriving at data input 335 during the setup time may not be sampled correctly, and the value of data at second data output 337 may not be updated accordingly. In this example, the data at second data output 337 would reflect the previous value held at data input 335. In some examples, the data at second data output 337 may be considered to be unstable or unknown when the setup time is breached.

The configuration depicted in FIG. 3 allows data launching device 310 to output an undelayed data signal that toggles between a first value and a second value responsive to a trigger element. First data output 317 is coupled to data input 315 via inverter 311. Upon a positive clock edge reaching first clock input 314, the data value at data input 315 is sampled, and the data value at first data output 317 is updated to reflect the sampled value. Data launched from first data output 317 then returns to data input 315 via inverter 311, toggling the value from 0 to 1 or from 1 to 0. Each successful trigger element reaching first clock input 314 will cause this process to repeat.

Data leaving from first data output 317 also travels to data input 345 of digital comparator logic device 340, as well as to data input 335 of state based device 330 via delay device 320. Delay device 320 may be configured to delay the arrival of the undelayed data signal at first data input 335 for a third time interval, the third time interval being less than or equal to the difference between the first time interval and the second time interval. In this way, delay device 320 may be tuned such that data leaving first data output 317 upon a first trigger element arriving at first clock input 314 arrives at data input 335 at or just before the setup time interval for a second trigger element arriving at second clock input 334. In this way, when the second trigger element reaches clock inputs 314 and 334, state based devices 312 and 330 will sample and output opposite values. Thus, the values of data at data inputs 345 and 346 should always be different, and digital comparator logic device 340 will output data indicative that a setup time violation has not occurred. If data is further delayed between first data output 317 and data input 335, or the speed of clocking device 350 is increased, state based devices 312 and 330 may sample and output equal values, and digital comparator logic device 340 will output data indicative that a setup time violation has occurred. This process is discussed further below, and in reference to example time plots shown in FIGS. 4 and 5.

Figure 4:
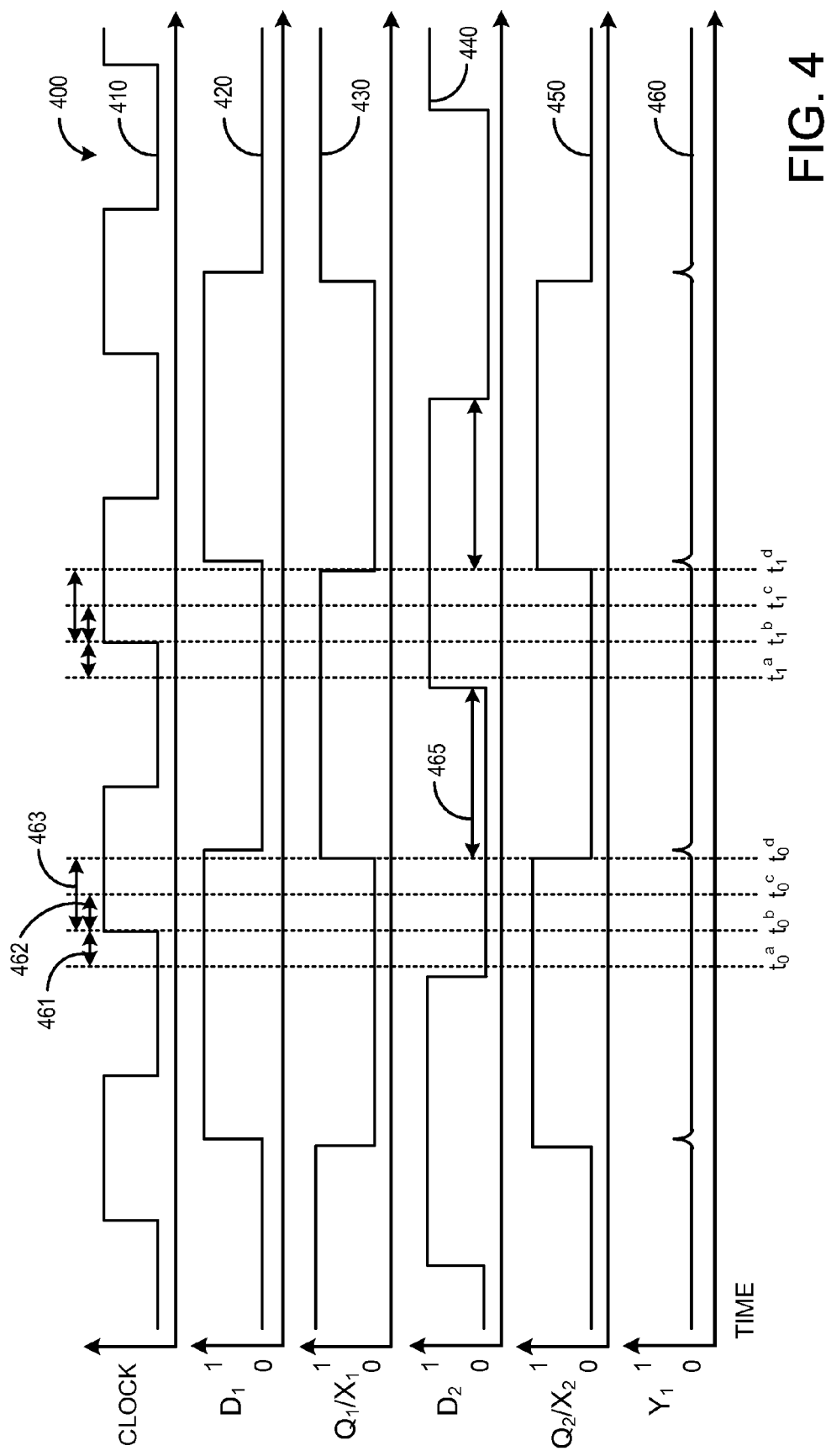
FIG. 4 depicts an example timeline for the operation of the system shown in FIG. 3 during normal operating conditions.

FIG. 4 depicts an example timing plot 400 showing data values at various points of digital logic circuit 300 over time during normal operating conditions. Plot 410 depicts the value of a clock signal at clocking device 350, and hence at first clock input 314 and second clock input 334. Plot 420 depicts the value $D_1$ at data input 315. Plot 430 depicts the value $Q_1$ at first data output 317 and the value $X_1$ at data input 345. In practice, there may be a delay between the time point when data leaves first data output 317 and when the data arrives at data input 345, but the difference is considered insignificant on the scale of timing plot 400. Plot 440 depicts the value $D_2$ at data input 335. Plot 450 depicts the value $Q_2$ at second data output 337 and the value $X_2$ at data input 346. In practice, there may be a delay between the time point when data leaves second data output 337 and when the data arrives at data input 346, but the difference is considered insignificant on the scale of timing plot 400. Plot 460 depicts the value $Y_1$ at third data output 347.

Fixed time values are depicted by double-sided arrows 461, 462, 463, and 465. Arrow 461 represents the setup time required for data to be held at a data input (e.g. data inputs 315 and 335) prior to a trigger element arriving at a clock input (e.g. clock inputs 314 and 334) in order for the data to be sampled properly and the value at the respective data output (e.g. data outputs 317 and 337) to be updated. Arrow 462 represents the hold time required for data to be held at a data input (e.g. data inputs 315 and 335) following a trigger element arriving at a clock input (e.g. clock inputs 314 and 334) in order for the data to be sampled properly and the value at the respective data output (e.g. data outputs 317 and 337) to be updated. Arrow 463 represents the propagation delay between the time when a trigger element arrives at a clock input (clock inputs 314 and 334) and the time when the value at the respective data output (e.g. data outputs 317 and 337) is updated. Arrow 465 represents the length of time a data signal originating at first data output 317 is delayed by delay device 320 before arriving at data input 335. As shown in FIG. 4, the fixed time values represented by the double-sided arrows are applicable during each clock cycle.

Plot 410 depicts clocking device 350 outputting a signal that periodically cycles between a lower value and a higher value. In this example, state based devices 312 and 330 are positive edge triggered flip-flops. As such, the transition of the clock signal from the lower value to the higher value acts as the trigger element for the flip-flops.

At time $t_0{}^a$, $D_1$ has a value of 1, as shown by plot 420, and $D_2$ has a value of 0, as shown by plot 440. At time $t_0{}^b$, a rising clock edge is produced by clocking device 350 and arrives at clock inputs 314 and 334. $D_1$ and $D_2$ are held steady from time $t_0{}^a$ to time $t_0{}^b$, satisfying the setup time requirement, and from time $t_0{}^b$ to time $t_0{}^c$, satisfying the hold time requirement. As such, the values of $D_1$ and $D_2$ are sampled and the values of $Q_1$ and $Q_2$ are updated to 1 and 0, respectively at time $t_0{}^d$, following the propagation delay.

At time $t_0{}^d$, first data output 317 launches a value of 1, and second data output 337 launches a value of 0. This updates the values of $X_1$ and $X_2$ to 1 and 0, respectively. Digital comparator logic device 340, depicted in FIG. 3 as an XNOR device, compares the values of $X_1$ and $X_2$, and updates the value of $Y_1$ to 0, as shown by plot 460. A small glitch may occur at $Y_1$, when the values entering data inputs 345 and 346 both change as shown in plot 460. As described below and with regards to FIG. 6, third data output 347 may be coupled to a flip-flop or other state based device in order to provide a steady-state value for downstream applications.

Data launched from first data output 317 is also routed to data input 315 via inverter 311. As such, the value of $D_1$ is updated from 1 to 0. Data launched from first data output 317 is also routed to data input 335 via delay device 320. As such, the value of $D_2$ is not updated until after the delay represented by arrow 465. As described above, the delay device is tuned such that the value of $D_2$ should update at or just prior to the setup time required by state based device 330. As shown by plot 440, this condition is satisfied in this example, as the value of $D_2$ is updated prior to time $t_1{}^a$.

At time $t_1{}^a$, $D_1$ has a value of 0, as shown by plot 420, and $D_2$ has a value of 1, as shown by plot 440. At time $t_1{}^b$, a rising clock edge is produced by clocking device 350 and arrives at clock inputs 314 and 334. $D_1$ and $D_2$ are held steady from time $t_1{}^a$ to time $t_1{}^b$, satisfying the setup time requirement, and from time $t_1{}^b$ to time $t_1{}^c$, satisfying the hold time requirement. As such, the values of $D_1$ and $D_2$ are sampled and the values of $Q_1$ and $Q_2$ are updated to 0 and 1, respectively at time $t_1{}^d$, following the propagation delay.

At time $t_1{}^d$, first data output 317 launches a value of 0, and second data output 337 launches a value of 1. This updates the values of $X_1$ and $X_2$ to 0 and 1, respectively. Digital comparator logic device 340, depicted in FIG. 3 as an XNOR device, compares the values of $X_1$ and $X_2$, and maintains the value of $Y_1$ at 0, as shown by plot 460. As described above, a small glitch may occur at $Y_1$, when the values entering data inputs 345 and 346 both change as shown in plot 460.

Data launched from first data output 317 is also routed to data input 315 via inverter 311. As such, the value of $D_1$ is updated from 0 to 1. Data launched from first data output 317 is also routed to data input 335 via delay device 320. As such, the value of $D_2$ is not updated until after the delay represented by arrow 465. As long as there is no change in clock speed, or additional delay in signal propagation, no setup time violations should occur, and the steady-state value of $Y_1$ should remain 0.

Figure 5:
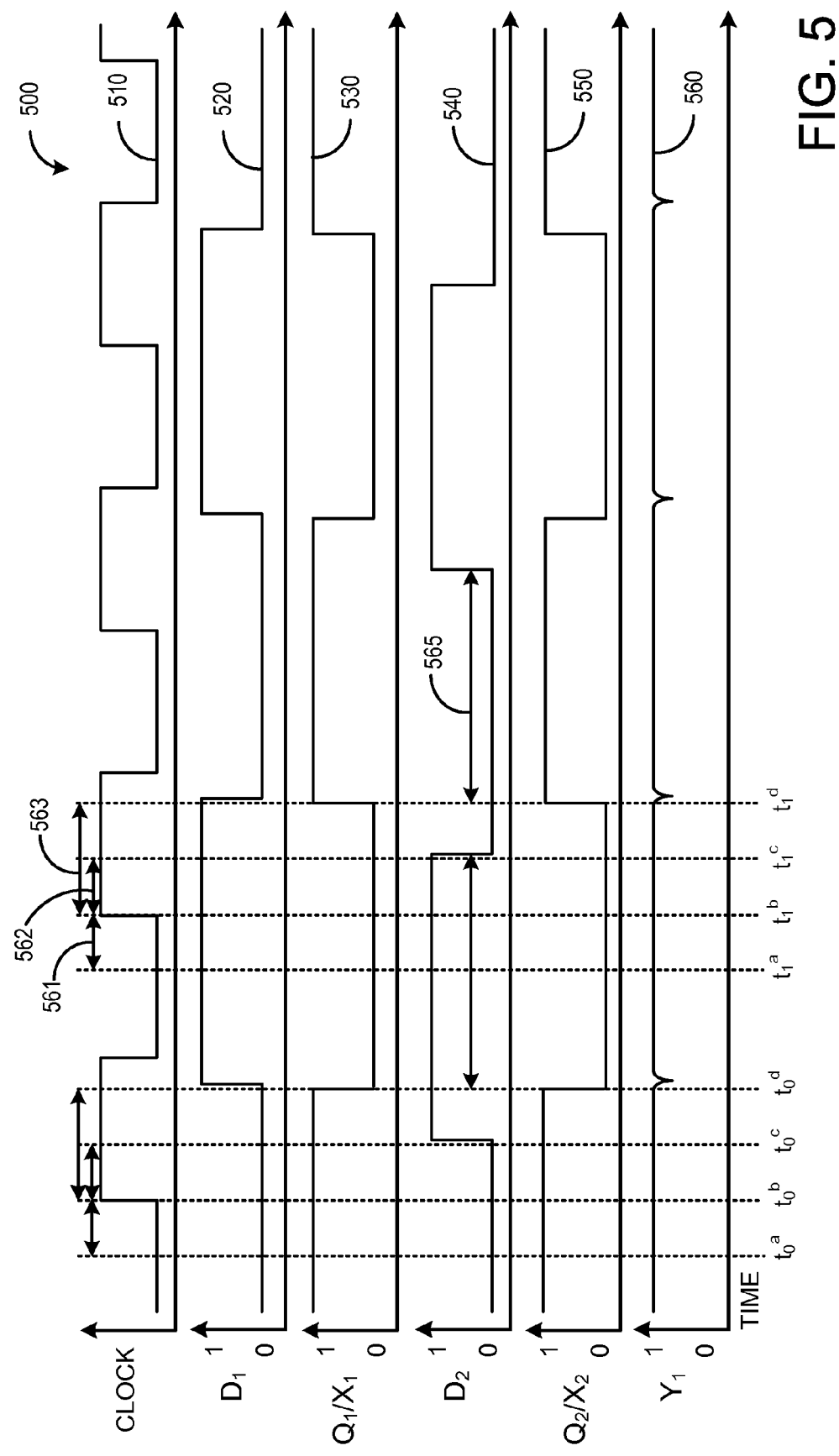
FIG. 5 depicts an example timeline for the operation of the system shown in FIG. 3 during conditions that would indicate a setup time violation.

FIG. 5 depicts an example timing plot 500 showing data values at various points of digital logic circuit 300 over time during operating conditions where the clocking device is operating at a faster speed than the clocking device described in regards to FIG. 4. Plot 510 depicts the value of a clock signal at clocking device 350, and hence at clock inputs 314 and 334. Plot 520 depicts the value $D_1$ at data input 315. Plot 530 depicts the value $Q_1$ at first data output 317 and the value $X_1$ at data input 345. In practice, there may be a delay between the time point when data leaves first data output 317 and when the data arrives at data input 345, but the difference is considered insignificant on the scale of timing plot 500. Plot 540 depicts the value $D_2$ at data input 335. Plot 550 depicts the value $Q_2$ at second data output 337 and the value $X_2$ at data input 346. In practice, there may be a delay between the time point when data leaves second data output 337 and when the data arrives at data input 346, but the difference is considered insignificant on the scale of timing plot 500. Plot 560 depicts the value $Y_1$ at third data output 347.

Fixed time values are depicted by double-sided arrows 561, 562, 563, and 565. Arrow 561 represents the setup time required for data to be held at a data input (e.g. data inputs 315 and 335) prior to a trigger element arriving at a clock input (e.g. clock inputs 314 and 334) in order for the data to be sampled properly and the value at the respective data output (e.g. data outputs 317 and 337) to be updated. Arrow 562 represents the hold time required for data to be held at a data input (e.g. data inputs 315 and 335) following a trigger element arriving at a clock input (e.g. clock inputs 314 and 334) in order for the data to be sampled properly and the value at the respective data output (e.g. data outputs 317 and 337) to be updated. Arrow 563 represents the propagation delay between the time when a trigger element arrives at a clock input (e.g. clock inputs 314 and 334) and the time when the value at the respective data output (e.g. data outputs 317 and 337) is updated. Arrow 565 represents the length of time a signal originating at first data output 317 is delayed via delay device 320 before arriving at data input 335. The durations represented by arrows 561, 562, 563, and 565 have the same absolute value as the durations represented by arrows 461, 462, 463, and 465, respectively. However, as the clock period represented by plot 510 is shorter than the clock period represented by plot 410, the durations are longer respective to the clock cycle. As shown in FIG. 5, the fixed time values represented by the double-sided arrows are applicable during each clock cycle.

Plot 510 depicts clocking device 350 outputting a signal that periodically cycles between a lower value and a higher value. In this example, state based devices 312 and 330 are positive edge triggered flip-flops. As such, the transition of the clock signal from the lower value to the higher value acts as the trigger element for the flip-flops.

At time $t_0{}^a$, $D_1$ has a value of 0, as shown by plot 520, and $D_2$ has a value of 0, as shown by plot 540. At time $t_0{}^b$, a rising clock edge is produced by clocking device 350 and arrives at clock inputs 314 and 334. $D_1$ is held steady from time $t_0{}^a$ to time $t_0{}^b$, satisfying the setup time requirement for state based device 312, and from time $t_0{}^b$ to time $t_0{}^c$, satisfying the hold time requirement for the state based device. As such, the value of $D_1$ is sampled and the value of $Q_1$ is updated to 0 at time $t_0{}^d$, following the propagation delay. $D_2$ is also held steady from time $t_0{}^a$ to time $t_0{}^b$, satisfying the setup time requirement for state based device 330, and from time $t_0{}^b$ to time $t_0{}^c$, satisfying the hold time requirement for the state based device. As such, the value of $D_2$ is sampled and the value of $Q_2$ is updated to 0 at time $t_0{}^d$, following the propagation delay.

At time $t_0{}^d$, first data output 317 launches a value of 0, and second data output 337 launches a value of 0. This updates the values of $X_1$ and $X_2$ to 0 and 0, respectively. Digital comparator logic device 340, depicted in FIG. 3 as an XNOR device, compares the values of $X_1$ and $X_2$, and updates the value of $Y_1$ to 1, as shown by plot 560. This indicates that a setup time violation has been detected. A small glitch may occur at $Y_1$, when the values entering data inputs 345 and 346 both change, as shown in plot 560. As described below and with regards to FIG. 6, third data output 347 may be coupled to a flip-flop or other state based device in order to provide a steady-state value for downstream applications.

Data launched from first data output 317 is also routed to data input 315 via inverter 311. As such, the value of $D_1$ is updated from 0 to 1 immediately following time $t_0{}^d$. Data launched from first data output 317 is also routed to data input 335 via delay device 320. As such, the value of $D_2$ is not updated until after the delay represented by arrow 565. As described above, the delay device is tuned such that the value of $D_2$ should update at or just prior to the setup time required by state based device 330. However, as the clock has been sped up, the value of $D_2$ does not update until after time $t_1{}^c$. Thus, instead of $D_1$ and $D_2$ holding opposite values when a clock edge arrives at clock inputs 312 and 330, D1 and D2 will hold equal values, signifying a setup time violation.

At time $t_1{}^a$, $D_1$ has a value of 1, as shown by plot 520, and $D_2$ has a value of 1, as shown by plot 540. At time $t_1{}^b$, a rising clock edge is produced by clocking device 350 and arrives at clock inputs 314 and 334. $D_1$ is held steady from time $t_1{}^a$ to time $t_1{}^b$, satisfying the setup time requirement, and from time $t_1{}^b$ to time $t_1{}^c$, satisfying the hold time requirement. As such, the value of $D_1$ is sampled and the value of $Q_1$ is updated to 1 at time $t_1{}^d$, following the propagation delay. $D_2$ is also held steady from time $t_1{}^a$ to time $t_1{}^b$, satisfying the setup time requirement for state based device 330, and from time $t_1{}^b$ to time $t_1{}^c$, satisfying the hold time requirement for the state based device. As such, the value of $D_2$ is sampled and the value of $Q_2$ is updated to 1 at time $t_1{}^d$, following the propagation delay.

At time $t_1{}^d$, first data output 317 launches a value of 1, and second data output 337 also launches a value of 1. This updates the values of both $X_1$ and $X_1$ to 1. Digital comparator logic device 340, depicted in FIG. 3 as an XNOR device, compares the values of $X_1$ and $X_2$, and maintains the value of $Y_1$ at 1, as shown by plot 460. This indicates that a setup time violation has been detected. As described above, a small glitch may occur at $Y_1$, when the values entering data inputs 345 and 346 both change as shown in plot 560.

In the example depicted in FIG. 4, the delay path of delay device 320 is tuned such that first data output 317 and second data output 337 launch opposite values when triggered by a clock edge. In the example depicted in FIG. 5, clocking device 350 has been sped up to the point where the delay path of delay device 320 causes first data output 317 and second data output 337 to launch equal values when triggered by a clock edge, signifying a setup time violation. In practice, increasing the speed of clocking device 350 may cause the value of data at first data input 335 to change during the setup time for state based device 330. The result of such a setup time violation is that the value of $Q_2$ at second data output 337 is indeterminate. State based device 330 may thus launch a value of 0 or 1, which may or may not signify a setup time violation at digital comparator logic device 340. To ensure that such an event does result in a setup time violation being indicated, redundancy may be built into the setup time violation detecting circuit. One example is described below and with regards to FIG. 6. In other examples, multiple copies of digital logic circuit 300 may be included in a setup time violation detecting circuit, ensuring the likelihood of one or more digital logic circuits detecting and signifying the setup time violation.

Figure 6:
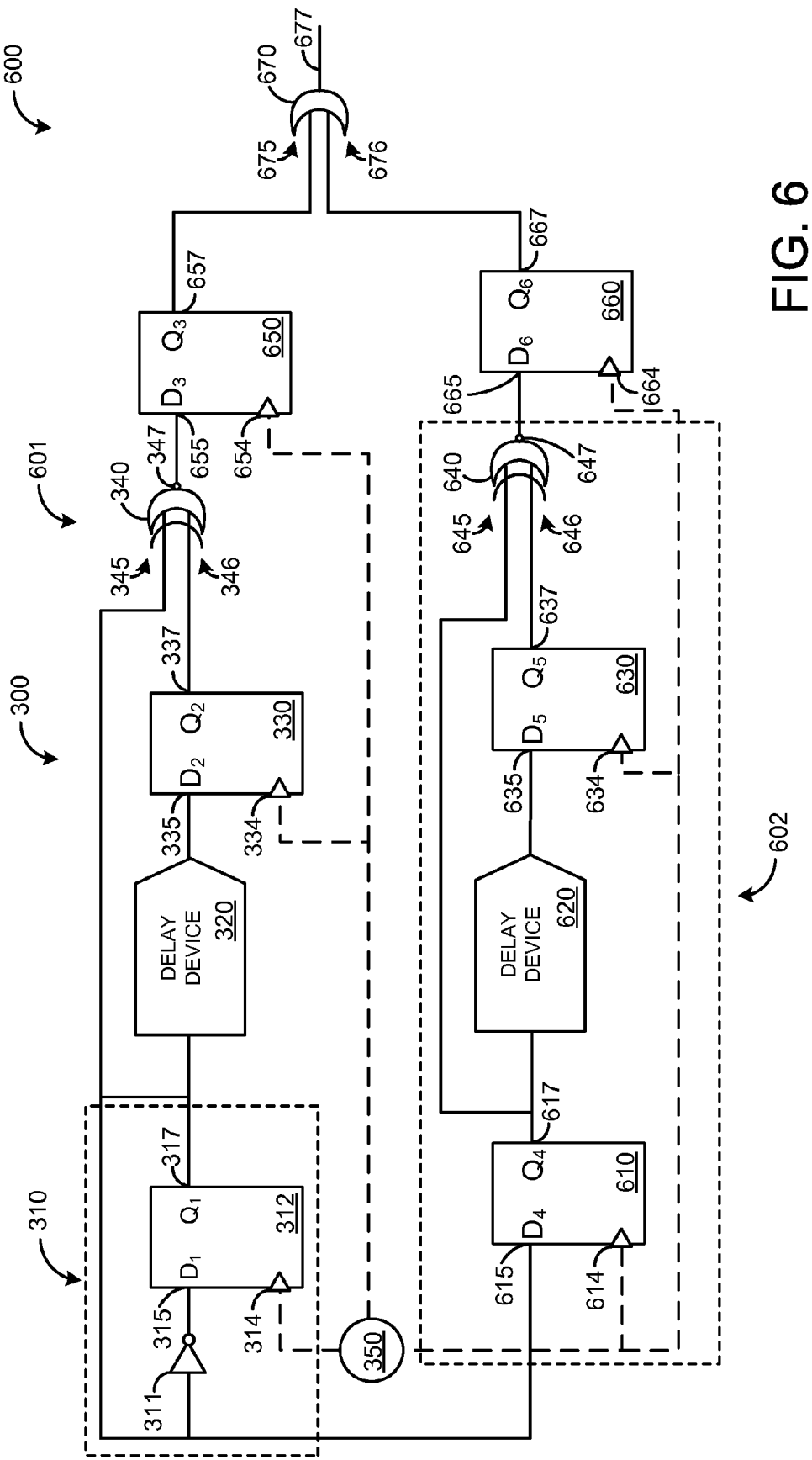
FIG. 6 schematically shows an example system for detecting setup time violations in accordance with the present disclosure.

FIG. 6 schematically shows an example setup time violation detecting circuit 600 for detecting setup time violations in a digital logic circuit. Setup time violation detecting circuit 600 may include digital logic circuit 300. In this configuration, data launching device 310, state based device 330, delay device 320, and digital comparator logic device 340 comprise a first branch 601 of a setup time violation detecting circuit. Setup time violation detecting circuit 600 may also comprise a complementary second branch 602 of the setup time violation detecting circuit. Complementary second branch 602 may receive the undelayed data signal output from the data launching device, the complementary second branch being functionally identical to the first branch, such that the setup time violation detecting circuit tests both rise time delays and fall time delays concurrently. In other words, if first branch 601 is testing a 0 to 1 transition, complementary second branch 602 will test a 1 to 0 transition concurrently. As logic gates such as NAND and NOR gates may have different rise time delays versus fall time delays, testing both types of delay concurrently will increase the sensitivity of setup time violation detecting circuit 600 with regards to detecting setup time violations.

Complementary second branch 602 may include state based device 610, delay device 620, state based device 630, and digital comparator logic device 640. Complementary second branch 602 may be coupled to data launching device 310 and clocking device 350.

As depicted in FIG. 6, state based device 610 is depicted as a flip-flop, but in some embodiments may be a latch or other digital logic device. State based device 610 includes a clock input 614, a data input 615, and a data output 617. Data input 615 is operatively coupled to first data output 317 of data launching device 310, and clock input 614 is operatively coupled to clocking device 350. In this way, the data output from state based device 610 will be one clock cycle behind the data output from data launching device 310. In the configuration depicted in FIG. 6, data launching device 310 outputs data that toggles between a first and second value responsive to trigger elements from clocking device 350. In this way, when data launching device 310 outputs data with the first value, state based device 610 will output data with the second value, and vice-versa. This configuration allows setup time violation detecting circuit 600 to test rise time delays and fall time delays concurrently.

Delay device 620 is shown operatively coupled between data output 617 and data input 635. State based device 630 is depicted as a flip-flop, but in some embodiments may be a latch or other digital logic device. State based device 630 includes a clock input 634, a data input 635, and a data output 637. Data input 635 is operatively coupled to data output 617 via delay device 620. Clock input 634 is operatively coupled to clocking device 350.

As depicted in FIG. 6, digital comparator logic device 640 is an XNOR gate. Digital comparator logic device 640 includes data inputs 645 and 646, and data output 647. When configured as an XNOR gate, digital comparator logic device 640 will output a signal indicative of a setup time violation when value $X_1$ entering data input 645 is the same value as $X_2$ entering data input 646. In other configurations, digital comparator logic device 640 may be configured to output a signal indicative of a setup time violation when value $X_1$ entering data input 645 is different from value $X_2$ entering data input 646.

As described above with regards to FIGS. 4 and 5, if the values of data at data inputs 345 and 346 change simultaneously, a slight glitch can occur in the data leaving from data output 347. To prevent glitches from signifying a setup time delay where none exists, third data output 347 may be coupled to state based device 650. State based device 650 is depicted as a flip-flop, but in some embodiments may be a latch or other digital logic device. State based device 650 includes a clock input 654, a data input 655, and a data output 657. Data input 655 is operatively coupled to third data output 347. Clock input 654 is operatively coupled to clocking device 350. In this way, state based device 650 may sample data output from digital comparator logic device 340, and output steady-state data at data output 657 representative of whether or not a setup time violation has occurred.

Similarly, data output 647 may be coupled to state based device 660. State based device 660 is depicted as a flip-flop, but in some embodiments may be a latch or other digital logic device. State based device 660 includes a clock input 664, a data input 665, and a data output 667. Data input 665 is operatively coupled to data output 647. Clock input 664 is operatively coupled to clocking device 350. In this way, state based device 660 may sample data output from digital comparator logic device 640, and output steady-state data at data output 667 representative of whether or not a setup time violation has occurred.

The first and second branches of the setup time violation detecting circuit may be further coupled to a digital comparator logic device. As shown in FIG. 6, data outputs 657 and 667 may be further coupled to digital comparator logic device 670 via data inputs 675 and 676, respectively. Digital comparator logic device 670 is depicted here as an OR gate, and includes data inputs 675 and 676, as well as data output 677. When configured as an OR gate, digital comparator logic device 670 will output a signal indicative of a setup time violation when either the value of data entering data input 675 or the value of data entering data input 676 is indicative of a setup time violation. Data output 677 may be further coupled to additional digital logic circuitry, such that data indicative of a setup time violation may trigger the shut-down of secure portions of the digital logic circuitry. In some examples, data indicative of a setup time violation may be used to adjust logic parameters of the digital logic circuitry.

Figure 7:
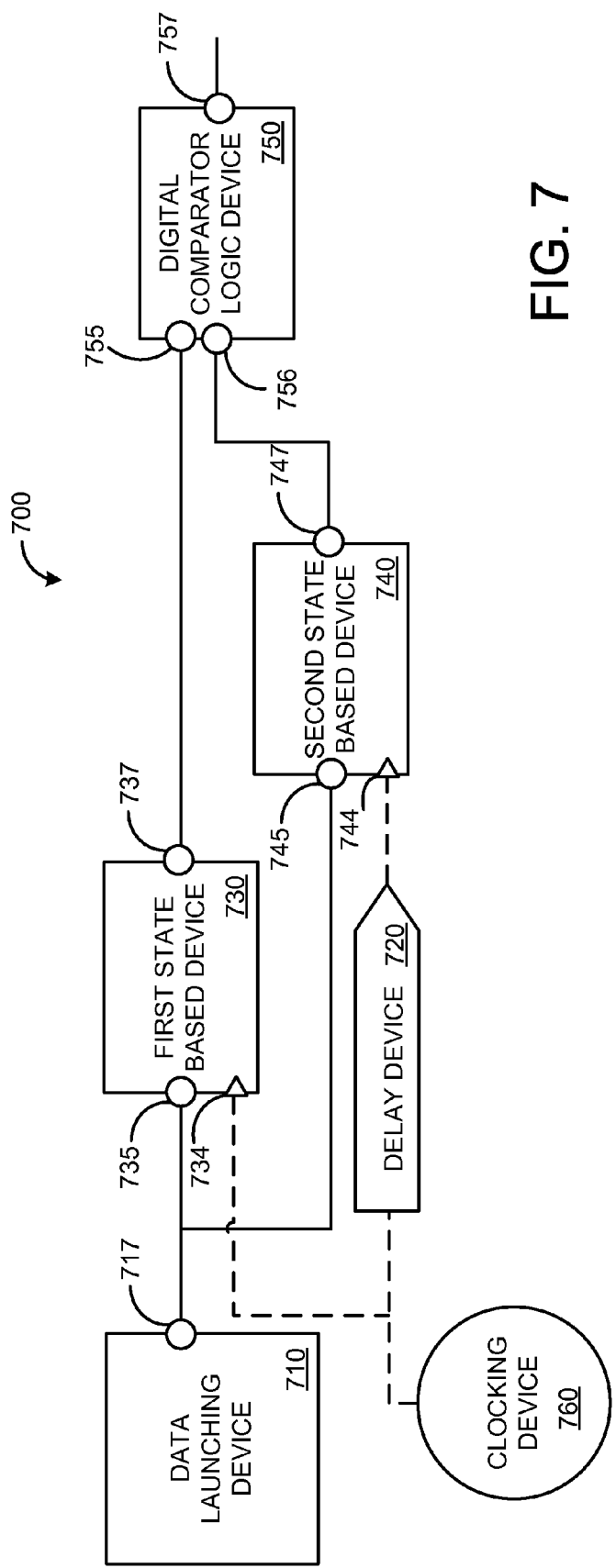
FIG. 7 schematically shows an example system for detecting hold time violations in accordance with the present disclosure.

FIG. 7 schematically shows an example digital logic circuit 700 for detecting hold time violations in a digital logic circuit. Digital logic circuit 700 may comprise data launching device 710, delay device 720, first state based device 730, second state based device 740, digital comparator logic device 750, and clocking device 760. Digital logic circuit 700 may be implemented as a subsystem of another system, for example functional timing sensor 110, or may be implemented as a stand-alone circuit.

As depicted in FIG. 7, data launching device 710 includes a first data output 717. First state based device 730 includes a first data input 735 operatively coupled to first data output 717, a first clock input 734 operatively coupled to clocking device 760, and a second data output 737. Second state based device 740 includes a second data input 745 operatively coupled to first data output 717, a second clock input 744 operatively coupled to clocking device 760, and a third data output 747. Digital comparator logic device 750 includes third data input 755, which is operatively coupled to second data output 737, fourth data input 756 which is operatively coupled to third data output 747, and fourth data output 757.

Data launching device 710 may be configured to output a first data signal via first data output 717. First data output 717 may be operatively coupled to first state based device 730, and to second state based device 740. Other devices may be coupled to first data output 717, such as a signal inverter, or another state based device. Some example configurations showing other devices coupled to first data output 717 are described below and with reference to FIGS. 8 and 11. Data launching device 710 may output a continuous signal or multiple individual signals. The data may be output in response to an internal timing mechanism or an external timing mechanism such as clocking device 760, as described below and with regards to FIG. 8. Data launching device 710 may include feed-back or feed-forward circuitry in order to modulate the data which is output at first data output 717. Data launching device 710 may generate the data which is output at first data output 717, or may receive the data from an external data generating source. Data launching device 710 may include a data storage device.

First state based device 730 may be configured to store a data signal at first data input 735, sample the data stored at first data input 735, and output the sampled data via second data output 737. In some embodiments of digital logic circuit 700, first state based device 730 may sample the data stored at first data input 735 in a manner that is dependent on a hold time. Similarly, second state based device 740 may be configured to store a data signal at second data input 745, sample the data stored at second data input 745 and output the sampled data via third data output 747. In some embodiments of digital logic circuit 700, second state based device 740 may sample the data stored at second data input 745 in a manner that is dependent on a hold time.

For example, second state based device 740 may include a digital state based storage device, such as a flip-flop or a latch that requires data held at second data input 745 to be held for a threshold time period following the initiation of data sampling. Such a time period is referred to herein as a hold time. In this way, hold time violations may alter the data output by second state based device 740 at third data output 747. For example, the data output at third data output 747 may be out-of-phase or otherwise have a value different from the expected value if a hold time violation occurs. The data may be output in response to an internal timing mechanism or an external timing mechanism, such as clocking device 760. In this way, digital logic circuit 700 may maintain precise timing throughout operation, and allow for alterations to that timing to manifest as hold timing violations.

Delay device 720 is depicted as being operatively intermediate clocking device 760 and second state based device 740. Delay device 720 may be configured to cause the second state based device to receive a delayed clock signal relative to an undelayed clock signal output by clocking device 760 and received by first state based device 730. Delay device 720 may be configured to delay a clock signal by a fixed time period or a time period that is dependent on other factors or conditions within the digital logic circuit. Delay device 720 may store the undelayed clock signal output by clocking device 760 and output the clock signal after a period of time, or delay device 720 may provide one or more digital delay devices the clock signal must traverse before reaching second clock input 744, for example, one or more logic gates or one or more inverters.

In this way, second state based device 740 may receive a trigger element included in the clock signal at a time point after the same trigger element reaches first state based device 730. This may cause second state based device 740 to begin sampling a data signal received from data launching device 710 after first state based device 730 begins sampling the data signal. Delay device 720 may be configured such that the clocking signal reaches second clock input 744 at a threshold time period prior to the data signal from data launching device 710 changing from a first value to a second value. Thus, any additional delay greater than the threshold time period in the clocking signal reaching second state based device 740 may manifest as a hold time violation, as the data signal will change values during or prior to the end of the hold time window.

Delay device 720 may be employed such that the path delay between clocking device 760 and second state based device 740 is at or just under the minimum period for the second state based device's hold time requirement. In some embodiments, the path delay will result in the hold time violation detecting device detecting a problematic environmental condition prior to other parts of the digital logic circuit exhibiting hold time faults. In some embodiments, the path delay may be set so that a hold time violation always occurs unless an environmental condition is altered. As such, the detection of a hold time violation would signify a normal condition, and non-detection of a hold time violation would signify a problematic environmental condition. A hold time violation detecting circuit, such as the circuit depicted in FIG. 1, may include a combination of multiple such types of devices and circuits.

Digital comparator logic device 750 may be configured to indicate a hold time violation if the data signal output by the first state based device violates a condition of comparison to the data signal output from the second state based device. For example, digital logic circuit 700 may be configured such that the data value at third data input 755 and the data value at fourth data input 756 should have the same value if no violation has occurred. If the values are tested to be the same by digital comparator logic device 750, the condition of comparison is met. If the values are tested to be different, the condition of comparison is violated. In some examples, digital logic circuit 700 may be configured such that the data value at third data input 755 and the data value at fourth data input 756 should have different values if no violation has occurred. If the values are tested to be different by digital comparator logic device 750, the condition of comparison is met. If the values are tested to be the same, the condition of comparison is violated.

Digital comparator logic device 750 may include one or more digital logic gates, such as XNOR, XOR, NAND, and/or NOR gates. Digital comparator logic device 750 may be configured to output a first value if a hold time violation is not detected and a second value if a hold time violation is detected. For example, digital comparator logic device 750 may be configured to output a value of 1 to indicate a hold time violation and to output a value of 0 to indicate no hold time violation. Alternatively, digital comparator logic device 750 may be configured to output a value of 0 to indicate a hold time violation and to output a value of 1 to indicate no hold time violation. Digital comparator logic device 750 may output a continuous signal based on the data received at data inputs 755 and 756, or may sample the data received at data inputs 755 and 756 for a period of time. In this way, occasional fluctuations in data may not be classified as hold time violations.

Fourth data output 757 may be further coupled to additional digital logic components, such as a data storage device or digital logic gate. Data output from digital comparator logic device 750 may be used alone or in conjunction with other data to impact the operation of the digital logic circuitry comprising digital logic circuit 700. For example, data indicative of a hold time violation may trigger the shut-down of secure sectors of the digital logic circuitry. In some examples, data indicative of a hold time violation may be used to adjust logic parameters of the digital logic circuitry.

Figure 8:
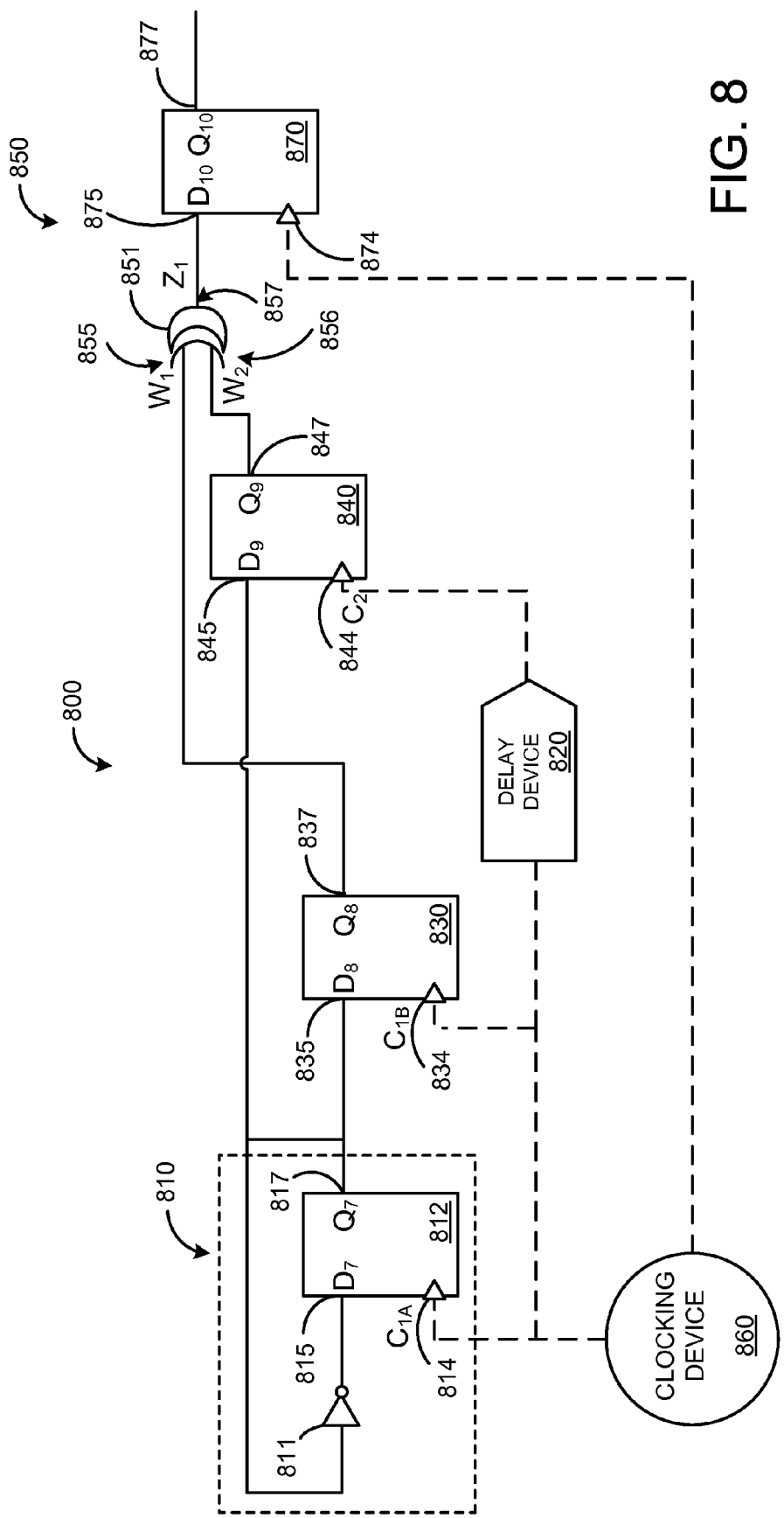
FIG. 8 schematically shows an example system for detecting hold time violations in accordance with the present disclosure.

FIG. 8 schematically shows an example digital logic circuit 800 for detecting hold time violations. Digital logic circuit 800 may include data launching device 810, delay device 820, first state based device 830, second state based device 840, digital comparator logic device 850, and clocking device 860. Digital logic circuit 800 may be implemented as a subsystem of another system, for functional timing sensor 110, or may be implemented as a stand-alone circuit. Digital logic circuit 800 is an example embodiment of digital logic circuit 700.

As depicted in FIG. 8, data launching device 810 includes state based device 812 and inverter 811. State based device 812 is depicted as a flip-flop, but in other embodiments may be a latch or other digital logic device. State based device 812 includes a third clock input 814, a fifth data input 815, and a first data output 817. Inverter 811 is coupled between first data output 817 and fifth data input 815. Third clock input 814 is operatively coupled to clocking device 860.

Delay device 820 is operatively coupled between clocking device 860 and second clock input 844. In some embodiments, delay device 820 may include a plurality of NAND and NOR gates. Delay device 820 may include NAND gates with two or more inputs, NOR gates with two or more inputs, inverters, XOR gates, buffers, OR gates, AND gates, multiplexors, adders, and/or other digital logic gates used for delaying signals. In some embodiments, data exiting delay device 820 holds the same value as data entering delay device 820. However, delay device 820 may be configured to output data with a different value than the data entering delay device 820.

First state based device 830 is depicted as a flip-flop, but in some embodiments may be a latch or other digital logic device. First state based device 830 includes first clock input 834, first data input 835, and second data output 837. First data input 835 is operatively coupled to first data output 817. First clock input 834 is operatively coupled to clocking device 860.

Similarly, second state based device 840 is depicted as a flip-flop, but in some embodiments may be a latch or other digital logic device. Second state based device 840 includes second clock input 844, second data input 845, and third data output 847. Second data input 845 is operatively coupled to first data output 817. Second clock input 844 is operatively coupled to clocking device 860 via delay device 820.

As depicted in FIG. 8, digital comparator logic device 850 includes XOR gate 851. XOR gate 851 includes third data input 855, fourth data input 856, and fourth data output 857. When configured to include an XOR gate, digital comparator logic device 850 will output a signal indicative of a hold time violation when value $W_1$ entering third data input 855 is the different from value $W_2$ entering fourth data input 856. In some examples, digital comparator logic device 850 may be configured to output a signal indicative of a hold time violation when value $W_1$ entering third data input 855 is the same as value $W_2$ entering fourth data input 856.

Digital comparator logic device 850 may also include third state based device 870. Third state based device 870 is depicted as a flip-flop, but in some embodiments may be a latch or other digital logic device. Third state based device 870 includes clock input 874, data input 875, and data output 877. Data input 875 is operatively coupled to fourth data output 857. Clock input 874 may be operatively coupled to clocking device 860 as shown, or may be operatively coupled to another clocking device. In examples where clock input 874 is operatively coupled to clocking device 860, a second delay device may be coupled between clocking device 860 and clock input 874. Third state based device 870 may be configured to sample data output from fourth data output 857 during periods when the value $Z_1$ is expected to be in a steady-state. In this way, small glitches of data that would normally be indicative of a hold-time violation may not trigger the shut-down of secure portions of the digital logic circuitry. In some embodiments, digital comparator logic device 850 may not include a third state based device. An additional delay device may be placed between second data output 837 and third data input 855, ensuring that data launched from first state based device 830 reaches third data input 855 at the same time that data launched from second state based device 840 reaches fourth data input 856.

Clocking device 860 may be configured to output a periodic clock signal having a period equal to a first time interval, and including a trigger element during each period. State based devices 812, 830, and 840 will be described herein as positive edge triggered flip-flops. As such, the trigger element included in each period will be described as the edge of a transition from a lower value to a higher value. In some example systems, state based devices 812, 830, and 840 may be negative edge triggered flip-flops, level triggered flip-flops (also referred to as latches), or a combination thereof.

In this example, state based devices 830 and 840 are configured to sample the data stored at data inputs 835 and 845 for a second time interval following a trigger element reaching clock inputs 834 and 844, and to output the sampled data via data outputs 837 and 847 in response to a trigger element reaching the clock inputs. In other words, data held at data inputs 835 and 845 is sampled by the flip-flop in response to a leading clock edge reaching clock input 834 and 844. The values at data output 837 and 847 are then updated to reflect the value of the sampled data. The second time interval following a trigger element may be referred to herein as the hold time for the flip-flop. Data must be stably held at data inputs 835 and 845 to be reliably sampled and transferred to data outputs 837 and 847. Data changing value at data inputs 835 and 845 during the hold time may not be sampled correctly, and the value of data at data outputs 837 and 847 may not be updated accordingly. In this example, the data at data outputs 837 and 847 would retain the previous value. In some examples, the data at data outputs 837 and 847 may be considered to be unstable or unknown when the setup time is breached.

The configuration depicted in FIG. 8 allows data launching device 810 to output a data signal that toggles between a first value and a second value responsive to a trigger element from a clock signal reaching clock input 814. Data output 817 is coupled to data input 815 via inverter 811. Upon a positive clock edge reaching clock input 814, the data value at fifth data input 815 is sampled, and the data value at first data output 817 is updated to reflect the sampled value. Data launched from first data output 817 then returns to fifth data input 815 via inverter 811, switching the data value from 0 to 1 or from 1 to 0. Each successful trigger element reaching clock input 814 will cause this process to repeat.

Data leaving from first data output 817 also travels to first data input 835 of first state based device 830 and to second data input 845 of second state based device 840. Delay device 820 may be configured to delay the arrival of the clock signal at second clock input 844 for a third time interval, the third time interval being less than or equal to the difference between the first time interval and the second time interval. In this way, delay device 820 may be tuned such that data arriving at data input 845 changes value at or just following a threshold time following the arrival of a trigger element at clock input 844. In this way, when the trigger element reaches clock inputs 834 and 844, state based devices 830 and 840 will sample and output equal values. Thus, the values of data at data inputs 855 and 856 should always be the same and digital comparator logic device 850 will output data indicative that a hold time violation has not occurred. If the clocking signal is further delayed between clocking device 860 and second clock input 844, state based devices 830 and 840 may sample and output opposite values, and digital comparator logic device 850 will output data indicating that a hold time violation has occurred. This process is discussed further below, and with reference to the example time plots shown in FIGS. 9 and 10.

Figure 9:
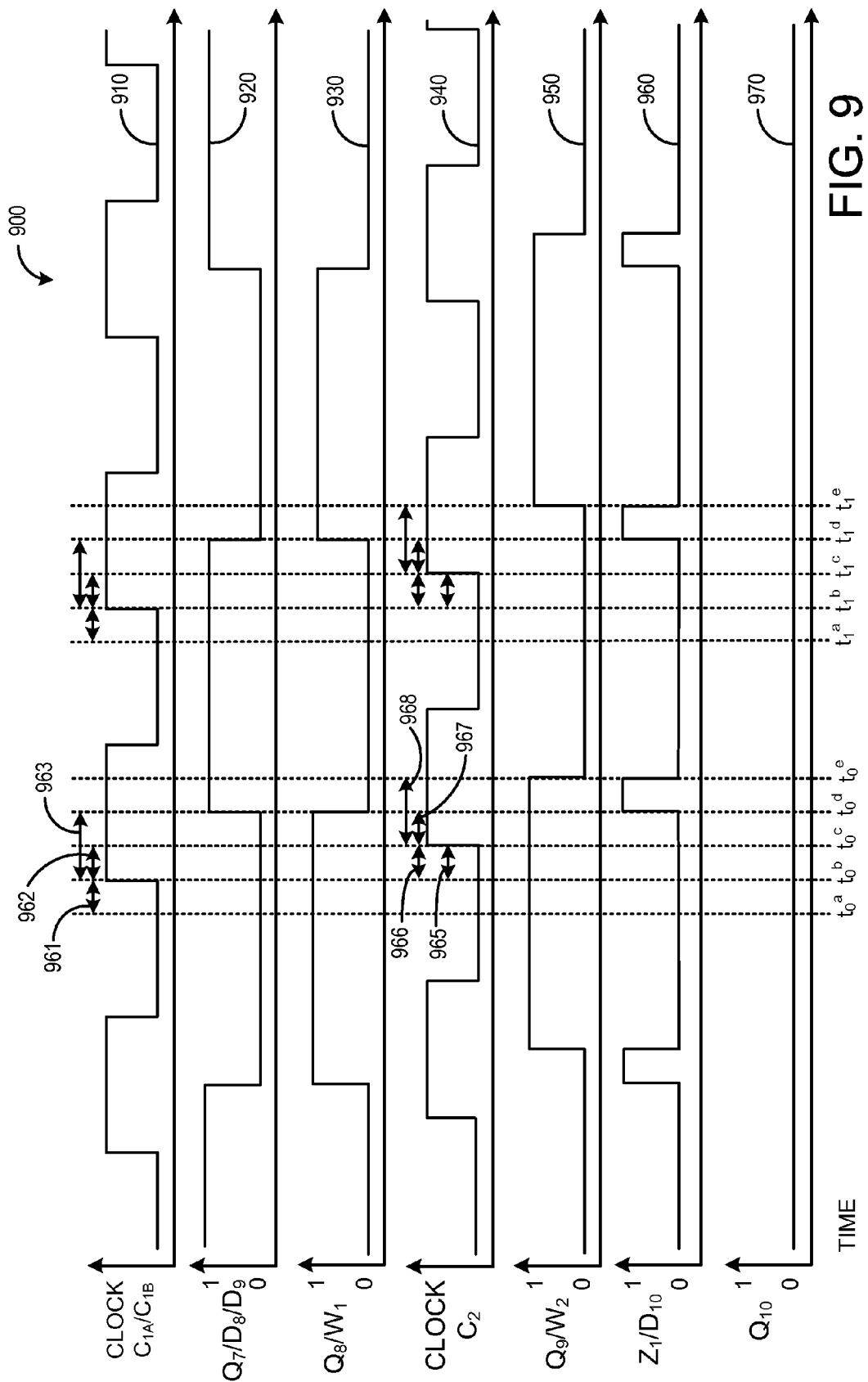
FIG. 9 shows depicts an example timeline for the operation of the system shown in FIG. 8 during normal operating conditions.

FIG. 9 depicts an example timing plot 900 showing data values at various points of digital logic circuit 800 over time during normal operating conditions. Plot 910 depicts the value of a clock signal at clocking device 860 and as seen at clock inputs 814 and 834. Plot 920 depicts the value $Q_7$ at first data output 817 and the values $D_8$ and $D_9$ at data inputs 835 and 845, respectively. In practice, there may be a delay between the time point when data leaves a data output and when the data arrives at the operatively coupled data input, but the difference is considered insignificant on the scale of timing plot 900. Plot 930 depicts the value $Q_8$ at second data output 837 and the value $W_1$ at third data input 855. Plot 940 depicts the value of the clock signal as seen at second clock input 844. Plot 950 depicts the value $Q_9$ at third data output 847 and the value $W_2$ at fourth data input 856. Plot 960 depicts the value $Z_1$ at data output 857 and the value $D_{10}$ at data input 875. Plot 970 depicts the value $Q_{10}$ at data output 877.

Fixed time values are depicted by double-sided arrows 961, 962, 963, 965, 966, 967, and 968. Arrow 961 represents the setup time required for data to be held at data inputs 815 and 835 prior to a trigger element arriving at clock inputs 814 and 834 in order for the data to be sampled properly and the value at the respective data output (data outputs 817 and 837) to be updated. Arrow 962 represents the hold time required for data to be held at data inputs 815 and 835 following a trigger element arriving at clock inputs 814 and 834 in order for the data to be sampled properly and the value at the respective data output (data outputs 817 and 837) to be updated. Arrow 963 represents the propagation delay between the time when a trigger element arrives at clock inputs 814 and 834 and the time when the value at the respective data output (data outputs 817 and 837) is updated.

Arrow 965 represents the length of time a clock signal originating at clocking device 860 is delayed via delay device 820 before arriving at second clock input 844. Arrow 966 represents the setup time for second state based device 840, and represents the same length of time as arrow 961. Arrow 967 represents the hold time for second state based device 840, and represents the same length of time as arrow 962. Arrow 968 represents the propagation time for second state based device 840, and represents the same length of time as arrow 963. As shown in FIG. 9, the fixed time values represented by the double-sided arrows are applicable during each clock cycle.

Plot 910 depicts clocking device 860 outputting a signal that periodically cycles between a lower value and a higher value. In this example, state based devices 812, 830, and 840 are positive edge triggered flip-flops. As such, the transition of the clock signal from the lower value to the higher value acts as the trigger element for the flip-flops. Clock inputs 814 and 834 receive an undelayed clock signal ($C_{1A}$ and $C_{1B}$) from clocking device 860, as shown by plot 910. However, as shown by plot 940, clock input 844 receives a delayed clocking signal ($C_2$), as the clock signal is routed through delay device 820. As such, each trigger element reaches second clock input 844 following a delay, represented by double sided arrow 965.

At time $t_0{}^a$, $D_8$ has a value of 0, as shown by plot 920. At time $t_0{}^b$, a rising clock edge is produced by clocking device 860 and arrives at clock inputs 814 and 834. $D_8$ is held steady from time $t_0{}^a$ to time $t_0{}^b$, satisfying the setup time requirement for state based devices 812 and 830, and from time $t_0{}^b$ to $t_0{}^c$, satisfying the hold time requirement for the state based devices. As such, the value of $D_8$ is sampled and the value of $Q_8$ is updated to 0 at time $t_0{}^d$, following the propagation delay for state based device 830. This value is then launched from second data output 837 and the value of $W_1$ at third data input 855 is updated to 0 accordingly, as shown by plot 930.

At time $t_0{}^b$, $D_9$ has a value of 0, as shown by plot 920. At time $t_0{}^c$, a rising clock edge arrives at second clock input 844, as shown by plot 940. $D_9$ is held steady from time $t_0{}^b$ to time $t_0{}^c$, satisfying the setup time requirement for state based device 840, and from time $t_0{}^c$ to $t_0{}^d$, satisfying the hold time requirement for the state based device. As such, the value of $D_9$ is sampled and the value of $Q_9$ is updated to 0 at time $t_0{}^e$, following the propagation delay for state based device 840. This value is launched from third data output 847 and the value of $W_2$ is updated to 0 accordingly, as shown by plot 950.

XOR gate 851 compares the values of $W_1$ and $W_2$ at data inputs 855 and 856. From time $t_0{}^a$ to time $t_0{}^d$, both $W_1$ and $W_2$ have a value of 1, and XOR gate 851 outputs a value $Z_1$ equal to 0. At time $t_0{}^d$, value $W_1$ is updated to 0, and XOR gate 851 outputs a value $Z_1$ equal to 1. At time $t_0{}^e$, value $W_2$ is updated to 0, and XOR gate 851 outputs a value $Z_1$ equal to 0.

A value $Z_1$ equal to 1 will be indicative of a hold time violation when the value is sampled during the same time frame that the value $D_8$ is sampled by first state based device 830. To ensure digital logic circuit 800 only indicates a hold time violation when appropriate, clock input 874 or state based device 870 may be operatively coupled to clocking device 860. In this way, data output 877 launches value $Q_{10}$ during the steady-state condition. As shown in plot 970, $Q_{10}$ will thus be given a value of 0, indicating that no hold-time violation has occurred.

At time $t_1{}^a$, $D_8$ has a value of 1, as shown by plot 920. At time $t_1{}^b$, a rising clock edge is produced by clocking device 860 and arrives at clock inputs 814 and 834. $D_8$ is held steady from time $t_1{}^a$ to time $t_1{}^b$, satisfying the setup time requirement for state based devices 812 and 830, and from time $t_1{}^b$ to $t_1{}^c$, satisfying the hold time requirement for the state based devices. As such, the value of $D_8$ is sampled and the value of $Q_8$ is updated to 1 at time $t_1{}^d$, following the propagation delay for state based device 830. This value is launched from second data output 837 and the value of $W_1$ at third data input 855 is updated to 1 accordingly, as shown by plot 930.

At time $t_1{}^b$, $D_9$ has a value of 1, as shown by plot 920. At time $t_1{}^c$, a rising clock edge arrives at clock input 844, as shown by plot 940. $D_9$ is held steady from time $t_1{}^b$ to time $t_1{}^c$, satisfying the setup time requirement for state based device 840 and from time $t_1{}^c$ to $t_1{}^d$, satisfying the hold time requirement for the state based device. As such, the value of $D_9$ is sampled and the value of $Q_9$ is updated to 1 at time $t_1{}^e$, following the propagation delay for state based device 840. This value is launched from data output 847 and the value of $W_2$ is updated to 1 accordingly.

XOR gate 851 compares the values of $W_1$ and $W_2$. From time $t_1{}^a$ to time $t_1{}^d$, both $W_1$ and $W_2$ have a value of 0, and XOR gate 851 outputs a value $Z_1$ equal to 0. At time $t_1{}^d$, value $W_1$ is updated to 1, and XOR gate 851 outputs a value $Z_1$ equal to 1. At time $t_1{}^e$, value $W_2$ is updated to 1, and XOR gate 851 outputs a value $Z_1$ equal to 0.

As described above, state based device 870 may be coupled to clocking device 860, and thus may sample data at data input 875 beginning at time $t_1{}^b$. In this way, data output 877 launches value $Q_{10}$ during the steady-state condition. As shown in plot 970, $Q_{10}$ will thus be given a value of 0, indicating that no hold-time violation has occurred.

Figure 10:
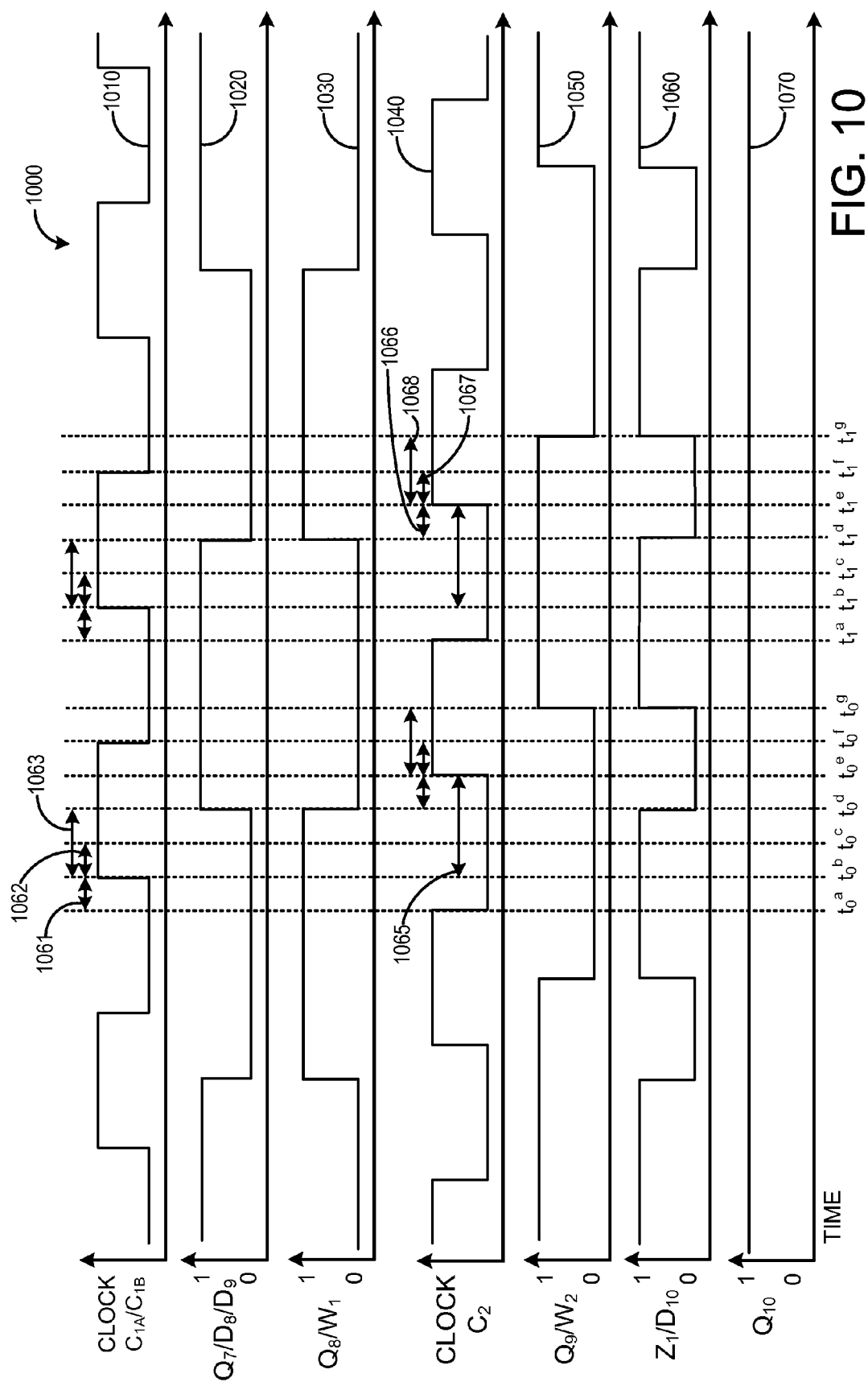
FIG. 10 shows depicts an example timeline for the operation of the system shown in FIG. 8 during conditions that would indicate a hold time violation.

FIG. 10 depicts an example timing plot 1000 showing data values at various points of digital logic circuit 800 over time during conditions that would indicate a hold time violation. Plot 1010 depicts the value of a clock signal at clocking device 860 and as seen at clock inputs 814 and 834. Plot 1020 depicts the value $Q_7$ at first data output 817 and the values $D_8$ and $D_9$ at data inputs 835 and 845, respectively. In practice, there may be a delay between the time point when data leaves a data output and when the data arrives at the operatively coupled data input, but the difference is considered insignificant on the scale of timing plot 1000. Plot 1030 depicts the value $Q_8$ at second data output 837 and the value $W_1$ at third data input 855. Plot 1040 depicts the value of the clock signal as seen at second clock input 844. Plot 1050 depicts the value $Q_9$ at third data output 847 and the value $W_2$ at fourth data input 856. Plot 1060 depicts the value $Z_1$ at data output 857 and the value D10 at data input 875. Plot 1070 depicts the value Q10 at data output 877.

Fixed time values are depicted by double-sided arrows 1061, 1062, 1063, 1065, 1066, 1067, and 1068. Arrow 1061 represents the setup time required for data to be held at data inputs 815 and 835 prior to a trigger element arriving at clock inputs 814 and 834 in order for the data to be sampled properly and the value at the respective data output (data outputs 817 and 837) to be updated. Arrow 1062 represents the hold time required for data to be held at data inputs 815 and 835 following a trigger element arriving at clock inputs 814 and 834 in order for the data to be sampled properly and the value at the respective data output (data outputs 817 and 837) to be updated. Arrow 1063 represents the propagation delay between the time when a trigger element arrives at clock inputs 814 and 834 and the time when the value at the respective data output (data outputs 817 and 837) is updated.

Arrow 1065 represents the length of time a clock signal originating at clocking device 860 is delayed via delay device 820 before arriving at second clock input 844. Arrow 1066 represents the setup time for second state based device 840, and represents the same length of time as arrow 1061. Arrow 1067 represents the hold time for second state based device 840, and represents the same length of time as arrow 1062. Arrow 1068 represents the propagation time for second state based device 840, and represents the same length of time as arrow 1063. As shown in FIG. 10, the fixed time values represented by the double-sided arrows are applicable during each clock cycle.

Plot 1010 depicts clocking device 860 outputting a signal that periodically cycles between a lower value and a higher value. In this example, state based devices 812, 830, and 840 are positive edge triggered flip-flops. As such, the transition of the clock signal from the lower value to the higher value acts as the trigger element for the flip-flops. Clock inputs 814 and 834 receive an undelayed clock signal from clocking device 860, as shown by plot 1010. However, as shown by plot 1040, second clock input 844 receives a delayed clocking signal $C_2$, as the clocking signal is routed through delay device 820. As such, each trigger element reaches second clock input 844 after a delay, represented by double sided arrow 1065.

At time $t_0{}^a$, $D_8$ has a value of 0, as shown by plot 1020. At time $t_0{}^b$, a rising clock edge is produced by clocking device 860 and arrives at clock inputs 814 and 834. $D_8$ is held steady from time $t_0{}^a$ to time $t_0{}^b$, satisfying the setup time requirement for state based devices 812 and 830, and from time $t_0{}^b$ to $t_0{}^c$, satisfying the hold time requirement for the state based devices. As such, the value of $D_8$ is sampled and the value of $Q_8$ is updated to 0 at time $t_0{}^d$, following the propagation delay for state based device 830. This value is launched from second data output 837 and the value of $W_1$ at third data input 855 is updated to 0 accordingly.

At time $t_0{}^d$, $D_9$ obtains a value of 1, as shown by plot 1020. At time $t_0{}^e$, a rising clock edge arrives at second clock input 844, as shown by plot 1040. $D_9$ is held steady from time $t_0{}^d$ to time $t_0{}^e$, satisfying the setup time requirement for state based device 840, and from time $t_0{}^e$ to time $t_0{}^f$, satisfying the hold time requirement for the state based device. As such, the value of $D_9$ is sampled and the value of $Q_9$ is updated to 1 at time $t_0{}^g$, following the propagation delay for state based device 840. This value is launched from data output 847 and the value of $W_2$ at fourth data input 855 is updated to 1 accordingly.

XOR gate 851 compares the values of $W_1$ and $W_2$. From time $t_0{}^a$ to time $t_0{}^d$, $W_1$ has a value of 1 and $W_2$ has a value of 0, and XOR gate 851 outputs a value $Z_1$ equal to 1. At time $t_0{}^d$, value $W_1$ is updated to 0, and XOR gate 851 outputs a value $Z_1$ equal to 0. At time $t_0{}^g$, value $W_2$ is updated to 1, and XOR gate 851 outputs a value $Z_1$ equal to 1.

A value $Z_1$ equal to 1 will be indicative of a hold time violation when the value is sampled during the same time frame that the value $D_8$ is sampled by first state based device 830. To ensure digital logic circuit 800 only indicates a hold time violation when appropriate, clock input 874 or state based device 870 may be operatively coupled to clocking device 860. In this way, data output 877 launches value $Q_{10}$ during the steady-state condition. As shown in plot 1070, $Q_{10}$ will thus be given a value of 1, indicating that a hold-time violation has occurred.

At time $t_1{}^a$, $D_8$ has a value of 1, as shown by plot 1020. At time $t_1{}^b$, a rising clock edge is produced by clocking device 860 and arrives at clock inputs 814 and 834. $D_8$ is held steady from time $t_1{}^a$ to time $t_1{}^b$, satisfying the setup time requirement for state based device 830 and from time $t_1{}^b$ to $t_1{}^c$, satisfying the hold time requirement for the state based device. As such, the value of $D_8$ is sampled and the value of $Q_8$ is updated to 1 at time $t_1{}^d$, following the propagation delay for state based device 830. This value is launched from data output 837 and the value of $W_1$ at third data input 855 is updated to 1 accordingly.

At time $t_1{}^d$, $D_9$ obtains a value of 0, as shown by plot 1020. At time $t_1{}^e$, a rising clock edge arrives at second clock input 844, as shown by plot 1040. $D_9$ is held steady from time $t_1{}^d$ to time $t_1{}^e$, satisfying the setup time requirement for state based device 840, and from time $t_1{}^e$ to $t_1{}^f$, satisfying the hold time requirement for the state based device. As such, the value of $D_9$ is sampled and the value of $Q_9$ is updated to 0 at time $t_1{}^g$, following the propagation delay for state based device 840. This value is launched from data output 847 and the value of $W_2$ at fourth data input 856 is updated to 0 accordingly.

XOR gate 851 compares the values of $W_1$ and $W_2$. From time $t_1{}^a$ to time $t_1{}^d$, $W_1$ has a value of 0 and $W_2$ has a value of 1, and XOR gate 851 outputs a value $Z_1$ equal to 1. At time $t_1{}^d$, value $W_1$ is updated to 1, and XOR gate 851 outputs a value $Z_1$ equal to 0. At time $t_1{}^g$, value $W_2$ is updated to 0, and XOR gate 851 outputs a value $Z_1$ equal to 1.

A value $Z_1$ equal to 1 may be indicative of a hold time violation when the value is held at 1 for a steady state condition. To ensure digital logic circuit 800 only indicates a hold time violation when the value of $Z_1$ is held at 1 for a steady state condition, state based device 870 may be coupled to clocking device 860, and thus may sample data at data input 875 beginning at time $t_1{}^b$. In this way, data output 877 launches value $Q_{10}$ during the steady-state condition. As shown in plot 1070, $Q_{10}$ will thus be given a value of 1, indicating that a hold-time violation has occurred.

In the example depicted in FIG. 9, the delay path of delay device 820 is tuned such that first state based device 830 and second state based device 840 sample equal values when triggered by a clock edge. In the example depicted in FIG. 10, the delay path of delay device 820 is increased such that first state based device 830 and second state based device 840 sample opposite values when triggered by a clock edge, signifying a hold time violation. In practice, increasing the delay path of delay device 820 may cause the value of data at second data input 845 to change during the hold time for second state based device 840. The result of such a hold time violation is that the value of $Q_9$ at third data output 847 is indeterminate. Second state based device 840 may thus launch a value of 0 or 1, which may or may not signify a hold time violation at digital comparator logic device 850. To ensure that such an event does result in a hold time violation being indicated, redundancy may be built into the hold time violation detecting circuit. One example is described below and with regards to FIG. 11. In other examples, multiple copies of digital logic circuit 800 may be included in a hold time violation detecting circuit, ensuring the likelihood of one or more digital logic circuits detecting and signifying the hold time violation.

Figure 11:
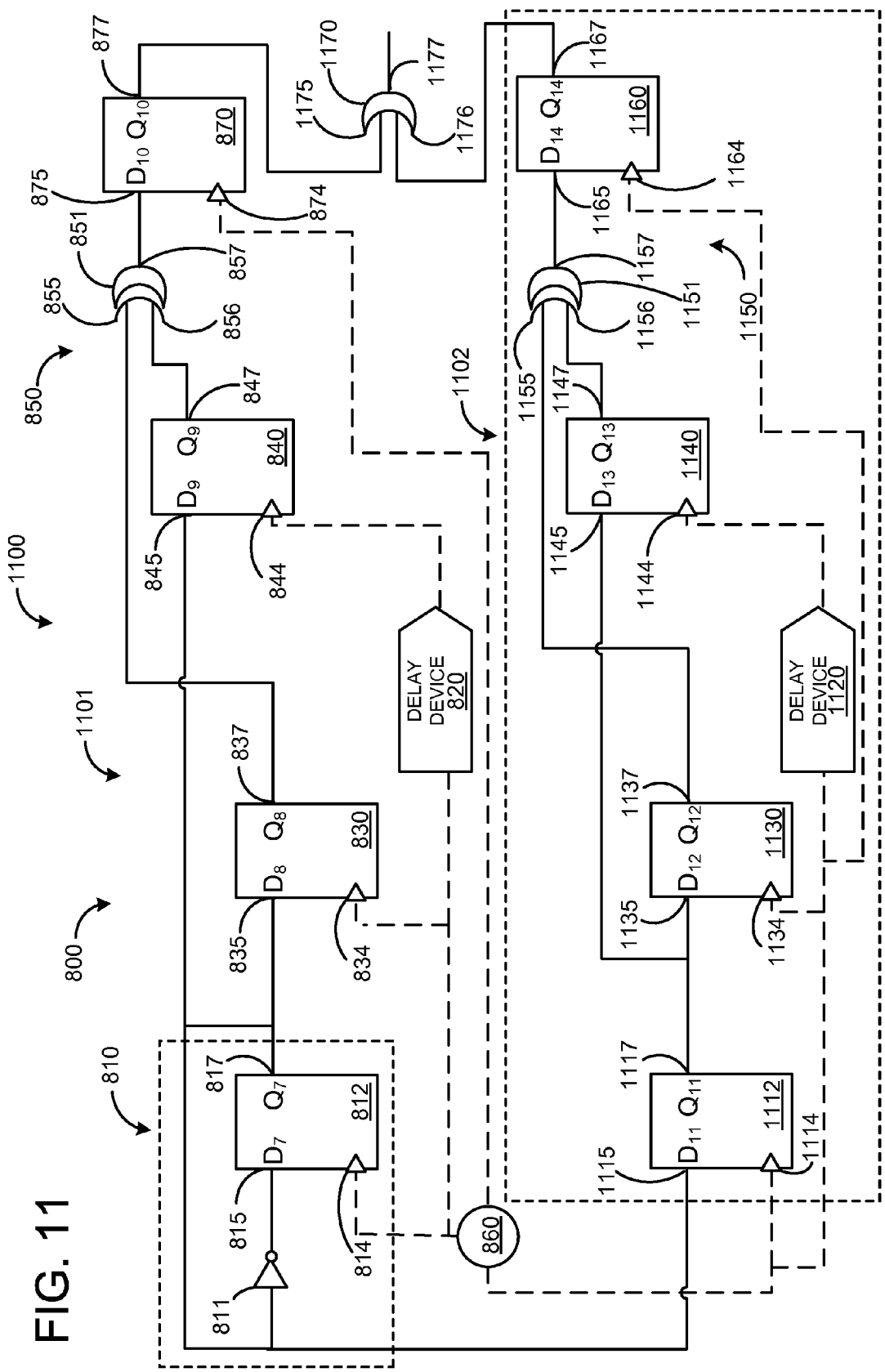
FIG. 11 schematically shows an example system for detecting hold time violations in accordance with the present disclosure.

FIG. 11 schematically shows an example hold time violation detecting circuit 1100 for detecting hold time violations in a digital logic circuit. Hold time violation detecting circuit 1100 may include digital logic circuit 800. In this configuration, data launching device 810, first state based device 830, second state based device 840, delay device 820 and digital comparator logic device 850 comprise a first branch 1101 of hold time violation detecting circuit 1100. Hold time violation detecting circuit 1100 may also comprise a complementary second branch 1102. Complementary second branch 1102 may receive the data signal output from data launching device 810, and is further coupled to clocking device 860, the complementary second branch being functionally identical to the first branch, such that the hold time violation detecting circuit tests both rise time delays and fall time delays concurrently. In other words, if first branch 1101 is testing a 0 to 1 transition, second branch 1102 will test a 1 to 0 transition concurrently. As logic gates such as NAND and NOR gates may have different rise time delays versus fall time delays, testing both types of delay concurrently will increase the sensitivity of hold time violation detecting circuit 1100 with regards to detecting hold time violations.

Complementary second branch 1102 may include state based device 1112, delay device 1120, state based device 1130, state based device 1140, and digital comparator logic device 1150. Complementary second branch 1102 may be coupled to data launching device 810 and clock device 860.

As depicted in FIG. 11, state based devices 1112, 1130, and 1140 are depicted as flip-flops, but in some embodiments may be latches or other digital logic devices. State based device 1112 includes a clock input 1114, a data input 1115, and a data output 1117. Data input 1115 is operatively coupled to first data output 817 of state based device 812, and clock input 1114 is operatively coupled to clocking device 860. In this way, the data output from state based device 1112 will be one clock cycle behind the data output from data launching device 810. In the configuration depicted in FIG. 11, data launching device 810 outputs data that toggles between a first and second value responsive to trigger elements from clocking device 860. In this way, when data launching device 810 outputs data with the first value, state based device 1112 will output data with the second value, and vice-versa. This configuration allows hold time violation detecting circuit 1100 to test rise time delays and fall time delays concurrently.

Delay device 1120 is shown operatively coupled between clocking device 860 and clock input 1144. State based device 1130 includes a clock input 1134, a data input 1135, and a data output 1137. Data input 1135 is operatively coupled to data output 1117. Clock input 1134 is operatively coupled to clocking device 860.

As depicted in FIG. 11, digital comparator logic device 1150 includes XOR gate 1151. XOR gate 1151 includes data inputs 1155 and 1156, and data output 1157. When configured to include an XOR gate, digital comparator logic device 1150 will output a signal indicative of a hold time violation when the value of data entering data input 1155 is different from the value of data entering data input 1156. In other configurations, digital comparator logic device 1150 may be configured to output a signal indicative of a hold time violation when data values entering data inputs 1155 and 1156 are equal.

Digital comparator logic device 1150 may also include state based device 1160. State based device 1160 is depicted as a flip-flop, but in some embodiments may be a latch or other digital logic device. State based device 1160 includes clock input 1164, data input 1165, and data output 1167. Data input 1165 is operatively coupled to data output 1157. Clock input 1164 may be operatively coupled to clocking device 860 as shown or may be operatively coupled to another clocking device. In examples where clock input 1164 is operatively coupled to clocking device 860, a delay device may be coupled between clocking device 860 and clock input 1164. State based device 1160 may be configured to sample data output from data output 1157 during periods when the data output value is expected to be in a steady-state. In this way, small glitches of data that would normally be indicative of a hold-time violation may not trigger the shut-down of secure portions of the digital logic circuitry. In some embodiments, digital comparator logic device 1150 may not include a state based device. Rather, an additional delay device may be placed between data output 1137 and data input 1155, ensuring that data launched from state based device 1130 reaches data input 1155 at the same time that data launched from state based device 1140 reaches data input 1156.

The first and second branches of the hold time violation detecting circuit 1100 may be further coupled to digital comparator logic device 1170. Digital comparator logic device 1170 is depicted here as an OR gate, and includes data inputs 1175 and 1176, as well as data output 1177. As shown in FIG. 11, data outputs 867 and 1167 may be further coupled to digital comparator logic device 1170 via data inputs 1175 and 1176, respectively. When configured as an OR gate, digital comparator logic device 1170 will output a signal indicative of a hold time violation when either the value of data entering data input 1175 or the value of data entering data input 1176 is indicative of a hold time violation. Data output 1177 may be further coupled to additional digital logic circuitry, such that data indicative of a hold time violation may trigger the shut-down of secure portions of the digital logic circuitry. In some examples, data indicative of a hold time violation may be used to adjust logic parameters of the digital logic circuitry.

It should be understood that a "device", as used herein may not necessarily refer to a single component or logic element. Rather, each device may include several different components or logic elements that cooperate to produce the desired function as described. There may be several different combinations of logic elements that may be used to create a device with a desired function. As such, the term "device" is not intended to refer to an irreducible component or logic element, although some examples may be given wherein a single component or logic element may be sufficient to perform a desired function.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for a functional timing sensor, comprising:
   a setup time violation detecting circuit configured to test both rise time delays and fall time delays concurrently;
   a hold time violation detecting circuit configured to test both rise time delays and fall time delays concurrently; and
   an interface from the setup time violation detecting circuit and the hold time violation detecting circuit, the interface providing a notification upon detection of a violation by either the setup time violation detecting circuit or the hold time violation detecting circuit.

2. A digital logic circuit for detecting setup time violations, comprising:
   a data launching device;
   a state based device;
   a delay device operatively intermediate the data launching device and the state based device, the delay device configured to cause the state based device to output a delayed data signal relative to an undelayed data signal output by the data launching device;
   a digital comparator logic device configured to indicate a setup time violation if the delayed data signal from the state based device violates a condition of comparison to the undelayed data signal from the data launching device; and wherein
   the digital logic circuit tests both rise time delays and fall time delays concurrently.

3. The digital logic circuit of claim 2, wherein:
   the data launching device includes a first data output and is configured to output the undelayed data signal via the first data output;
   the state based device includes a first data input operatively coupled to the first data output via the delay device and a second data output, and where the state based device is configured to:
   store a data signal at the first data input;

sample data stored at the first data input; and
output the sampled data via the second data output; and
the digital comparator logic device includes a second data input operatively coupled to the first data output, a third data input operatively coupled to the second data output, and a third data output.

4. The digital logic circuit of claim 3, further comprising:
a clocking device configured to output a periodic clock signal having a period equal to a first time interval, the periodic clock signal including a trigger element during each period; and
wherein:
the data launching device includes a first clock input operatively coupled to the clocking device, and where the undelayed data signal toggles between a first value and a second value responsive to a trigger element from the clocking device;
the state based device includes a second clock input operatively coupled to the clocking device, and where the state based device is configured to:
sample the data stored at the first data input for a second time interval beginning prior to a trigger element reaching the second clock input, the second time interval being shorter than the first time interval; and
output via the second data output the delayed data signal with the sampled data in response to a trigger element reaching the second clock input; and
the delay device is configured to delay arrival of the undelayed data signal at the first data input for a third time interval, the third time interval being less than or equal to the difference between the first time interval and the second time interval.

5. The digital logic circuit of claim 2, wherein the data launching device, the state based device, the delay device, and the digital comparator logic device comprise a first branch of a setup time violation detecting circuit, and wherein a complementary second branch of the setup time violation detecting circuit receives the undelayed data signal output from the data launching device, the complementary second branch being functionally identical to the first branch.

6. The digital logic circuit of claim 5, wherein the first and second branches of the setup time violation detecting circuit are further coupled to an OR gate.

7. The digital logic circuit of claim 4, wherein the data launching device further includes a flip-flop and an inverter, where the flip-flop further includes a fourth data input, and where the inverter is coupled between the first data output and the fourth data input.

8. The digital logic circuit of claim 4, wherein the state based device is a flip-flop.

9. The digital logic circuit of claim 4, wherein the delay device includes a plurality of NAND and NOR gates.

10. The digital logic circuit of claim 4, wherein the digital comparator logic device is an XNOR gate.

11. A digital logic circuit for detecting hold time violations in a digital logic circuit, comprising:
a data launching device;
a first state based device operatively coupled to the data launching device without a delay device operatively intermediate the data launching device and the first state based device;
a second state based device operatively coupled to the data launching device without a delay device operatively intermediate the data launching device and the second state based device;
a clocking device operatively coupled to the first and second state based devices;
a delay device operatively intermediate the clocking device and the second state based device, the delay device configured to delay sampling of a first data signal output by the data launching device by the second state based device relative to sampling of the first data signal by the first state based device; and
a digital comparator logic device configured to indicate a hold time violation if a second data signal output from the first state based device violates a condition of comparison to a third data signal output from the second state based device.

12. The digital logic circuit of claim 11, wherein:
the data launching device includes a first data output and is configured to output the first data signal via the first data output;
the first state based device includes a first data input operatively coupled to the first data output, a first clock input operatively coupled to the clocking device, and a second data output, and where the first state based device is configured to:
store a data signal at the first data input;
sample data stored at the first data input; and
output the sampled data via the second data output in the form of a second data signal;
the second state based device includes a second data input operatively coupled to the first data output, a second clock input operatively coupled to the clocking device, and a third data output, and where the second state based device is configured to:
store a data signal at the second data input;
sample the data stored at the second data input; and
output the sampled data via the third data output in the form of a third data signal; and
the digital comparator logic device includes a third data input operatively coupled to the second data output, a fourth data input operatively coupled to the third data output and a fourth data output.

13. The digital logic circuit of claim 12, wherein:
the clocking device is configured to output a periodic clock signal having a period equal to a first time interval, and including a trigger element during each period;
the data launching device includes a first clock input operatively coupled to the clocking device and where the first data signal toggles between a first value and a second value responsive to a trigger element from the clocking device;
the first state based device includes a second clock input operatively coupled to the clocking device, and where the first state based device is configured to:
sample the data stored at the first data input for a second time interval beginning when a trigger element reaches the second clock input, the second time interval being shorter than the first time interval; and
output the sampled data via the second data output in the form of the second data signal;
the second state based device includes a third clock input operatively coupled to the clocking device, and where the second state based device is configured to:
sample the data stored at the second data input for the second time interval beginning when a trigger element reaches the third clock input; and
output the sampled data via the third data output in the form of the third data signal;
the delay device is configured to delay arrival of the periodic clock signal at the third clock input for a third time interval, the third time interval being less than or equal to the second time interval.

14. The digital logic circuit of claim 11, wherein the data launching device, the first and second state based devices, the delay device, and the digital comparator logic device comprise a first branch of a hold time violation detecting circuit, and wherein a complementary second branch of the hold time violation detecting circuit receives the data signal output from the data launching device and is further coupled to the clocking device, the complementary second branch being functionally identical to the first branch, such that the hold time violation detecting circuit tests both rise time delays and fall time delays concurrently.

15. The digital logic circuit of claim 14, wherein the first and second branches of the hold time violation detecting circuit are further coupled to an OR gate.

16. The digital logic circuit of claim 13, wherein the data launching device further includes a flip-flop and an inverter, where the flip-flop further includes a fifth data input, and where the inverter is coupled between the first data output and the fifth data input.

17. The digital logic circuit of claim 13, wherein the first and second state based devices are flip-flops.

18. The digital logic circuit of claim 13, wherein the delay device includes a plurality of NAND and NOR gates.

19. The digital logic circuit of claim 13, wherein the digital comparator logic device includes an XOR gate.

20. The digital logic circuit of claim 19, wherein the digital comparator logic device further includes a flip-flop coupled to an output of the XOR gate.

\* \* \* \* \*